(12) United States Patent
Fürsich

(10) Patent No.: US 10,127,463 B2
(45) Date of Patent: Nov. 13, 2018

(54) VEHICLE VISION SYSTEM WITH MULTIPLE CAMERAS

(71) Applicant: MAGNA ELECTRONICS INC., Auburn Hills, MI (US)

(72) Inventor: Manfred Fürsich, Oberhaching (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 237 days.

(21) Appl. No.: 14/946,853

(22) Filed: Nov. 20, 2015

(65) Prior Publication Data

US 2016/0148062 A1    May 26, 2016

Related U.S. Application Data

(60) Provisional application No. 62/120,041, filed on Feb. 24, 2015, provisional application No. 62/082,636, filed on Nov. 21, 2014.

(51) Int. Cl.
*H04N 7/18* (2006.01)
*H04N 7/00* (2011.01)
*G06K 9/00* (2006.01)
*H04N 5/232* (2006.01)
*H04N 13/02* (2006.01)
(Continued)

(52) U.S. Cl.
CPC ............ *G06K 9/00805* (2013.01); *B60R 1/00* (2013.01); *G06K 9/00791* (2013.01); *H04N 5/23238* (2013.01); *H04N 7/181* (2013.01); *H04N 13/0239* (2013.01); *H04N 13/239* (2018.05); *B60R 2300/105* (2013.01);
(Continued)

(58) Field of Classification Search
None
See application file for complete search history.

(56) References Cited

U.S. PATENT DOCUMENTS 5,550,677 A    8/1996    Schofield et al.
5,670,935 A    9/1997    Schofield et al.
(Continued)

FOREIGN PATENT DOCUMENTS

WO    WO2011/155878    12/2011

OTHER PUBLICATIONS

Hicks et al., "Panoramic Electronic Rear Vision for Automotive Applications", SAE Technical Paper Series, International Congress and Exposition, Detroit, MI, Mar. 1-4, 1999.

*Primary Examiner* — Heather R Jones
(74) *Attorney, Agent, or Firm* — Honigman Miller Schwartz and Cohn, LLP

(57) ABSTRACT

A vision system for a vehicle includes a plurality of cameras having respective fields of view exterior of the vehicle. The plurality of cameras includes driver and passenger side wide angle cameras having wide angle fields of view, driver and passenger side rearward viewing cameras having fields of view along the respective sides of the vehicle rearward of the vehicle, and a rearward camera having a wide angle field of view rearward of the vehicle. A display is operable to display images derived from image data captured by at least some of the cameras. The display is selectively operable to display images derived from image data captured by all of the plurality of cameras. An image processor is operable to process image data captured by at least some of the cameras to detect objects in the field of view of the at least some of the cameras.

20 Claims, 29 Drawing Sheets

(51) Int. Cl.
*H04N 13/239* (2018.01)
*B60R 1/00* (2006.01)

(52) U.S. Cl.
CPC ..... *B60R 2300/304* (2013.01); *B60R 2300/70* (2013.01); *B60R 2300/8093* (2013.01)

(56) References Cited

U.S. PATENT DOCUMENTS

| | | |
|---|---|---|
| 5,760,962 A | 6/1998 | Schofield et al. |
| 5,877,897 A | 3/1999 | Schofield et al. |
| 5,949,331 A | 9/1999 | Schofield et al. |
| 6,424,272 B1 | 6/2002 | Gutta et al. |
| 6,690,268 B2 | 2/2004 | Schofield et al. |
| 6,717,610 B1 | 4/2004 | Bos et al. |
| 7,005,974 B2 | 2/2006 | McMahon et al. |
| 7,307,655 B1 | 12/2007 | Okamoto et al. |
| 7,370,983 B2 | 5/2008 | De Wind et al. |
| 7,859,565 B2 | 12/2010 | Schofield et al. |
| 7,914,187 B2 | 3/2011 | Higgins-Luthman et al. |
| 8,421,865 B2 | 4/2013 | Euler et al. |
| 9,041,806 B2 | 5/2015 | Baur et al. |
| 9,085,261 B2 | 7/2015 | Lu et al. |
| 9,126,525 B2 | 9/2015 | Lynam et al. |
| 9,146,898 B2 | 9/2015 | Ihlenburg et al. |
| 9,150,155 B2 | 10/2015 | Vico et al. |
| 9,280,202 B2 | 3/2016 | Gieseke et al. |
| 9,380,219 B2 | 6/2016 | Salomonsson et al. |
| 9,491,451 B2 | 11/2016 | Pliefke |
| 9,580,013 B2 | 2/2017 | Wierich |
| 9,596,387 B2 | 3/2017 | Achenbach et al. |
| 9,762,880 B2 | 9/2017 | Pflug |
| 2003/0085999 A1 | 5/2003 | Okamoto et al. |
| 2004/0008407 A1 | 1/2004 | Wallerstein et al. |
| 2006/0015554 A1 | 1/2006 | Umezaki et al. |
| 2006/0050018 A1 | 3/2006 | Hutzel |
| 2006/0125921 A1 | 6/2006 | Foote |
| 2007/0041659 A1 | 2/2007 | Nobori et al. |
| 2007/0236595 A1 | 10/2007 | Pan et al. |
| 2008/0012879 A1 | 1/2008 | Clodfelter |
| 2008/0036576 A1* | 2/2008 | Stein ............... B60R 1/00 340/425.5 |
| 2008/0170803 A1 | 7/2008 | Forutanpour |
| 2009/0022422 A1 | 1/2009 | Sorek et al. |
| 2009/0153549 A1 | 7/2009 | Lynch et al. |
| 2009/0175492 A1 | 7/2009 | Chen et al. |
| 2010/0020170 A1 | 1/2010 | Higgins-Luthman |
| 2010/0134325 A1 | 6/2010 | Gomi et al. |
| 2010/0265048 A1 | 10/2010 | Lu et al. |
| 2010/0328499 A1 | 12/2010 | Sun |
| 2011/0032357 A1 | 2/2011 | Kitaura et al. |
| 2011/0156887 A1 | 6/2011 | Shen et al. |
| 2011/0175752 A1 | 7/2011 | Augst |
| 2011/0291918 A1 | 12/2011 | Surber et al. |
| 2012/0062745 A1* | 3/2012 | Han ............... B62D 15/029 348/148 |
| 2012/0162427 A1 | 6/2012 | Lynam |
| 2012/0257060 A1 | 10/2012 | Bos et al. |
| 2012/0265416 A1 | 10/2012 | Lu et al. |
| 2013/0250114 A1 | 9/2013 | Lu |
| 2014/0055616 A1* | 2/2014 | Corcoran ............ B60R 1/00 348/148 |
| 2014/0067206 A1 | 3/2014 | Pflug |
| 2014/0085472 A1 | 3/2014 | Lu et al. |
| 2014/0160276 A1 | 6/2014 | Pliefke et al. |
| 2014/0168415 A1 | 6/2014 | Ihlenburg et al. |
| 2014/0176605 A1 | 6/2014 | Gibson et al. |
| 2014/0247352 A1 | 9/2014 | Rathi et al. |
| 2014/0285666 A1 | 9/2014 | O'Connell et al. |
| 2014/0309884 A1 | 10/2014 | Wolf |
| 2014/0336876 A1 | 11/2014 | Gieseke et al. |
| 2014/0340510 A1 | 11/2014 | Ihlenburg et al. |
| 2014/0362209 A1 | 12/2014 | Ziegenspeck et al. |
| 2014/0368654 A1 | 12/2014 | Wierich |
| 2015/0002670 A1 | 1/2015 | Bajpai |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0042808 A1 | 2/2015 | Pflug |
| 2015/0049193 A1 | 2/2015 | Gupta et al. |
| 2015/0217693 A1 | 8/2015 | Pflieke et al. |
| 2015/0222798 A1 | 8/2015 | Sauer et al. |
| 2015/0232030 A1 | 8/2015 | Bongwald et al. |
| 2015/0294169 A1 | 10/2015 | Zhou |
| 2015/0296135 A1 | 10/2015 | Wacquant |
| 2016/0044284 A1 | 2/2016 | Goseberg et al. |
| 2016/0137126 A1 | 5/2016 | Fursich et al. |

* cited by examiner

_US 10,127,463 B2_

VEHICLE VISION SYSTEM WITH MULTIPLE CAMERAS

CROSS REFERENCE TO RELATED APPLICATIONS

The present application claims the filing benefits of U.S. provisional application Ser. No. 62/120,041, filed Feb. 24, 2015, and Ser. No. 62/082,636, filed Nov. 21, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and a display may provide a surround view display of images derived from image data captured by some or all of the cameras. The cameras may include (i) a driver-side wide angle camera having a wide angle field of view at the driver side of the vehicle, (ii) a driver-side rearward viewing camera having a field of view along the driver side of the vehicle rearward of the vehicle, (iii) a passenger-side wide angle camera having a wide angle field of view at the passenger side of the vehicle, (iv) a passenger-side rearward viewing camera having a field of view along the passenger side of the vehicle and rearward of the vehicle, (v) a rearward camera having a wide angle field of view rearward of the vehicle and (vi) a forward facing camera having a wide angle field of view forward of the vehicle. An image processor is operable to process image data captured by the cameras and the display is operable to display images derived from image data captured by at least some of the cameras.

The driver-side rearward viewing camera may be disposed at a driver side exterior rearview mirror of the vehicle and the passenger-side rearward viewing camera may be disposed at a passenger-side exterior rearview mirror of the vehicle. The wide angle field of view of the driver-side wide angle camera may have its principal axis directed at least partially downwardly and away from the driver side of the vehicle and the wide angle field of view of the passenger-side wide angle camera may have its principal axis directed at least partially downwardly and away from the passenger side of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
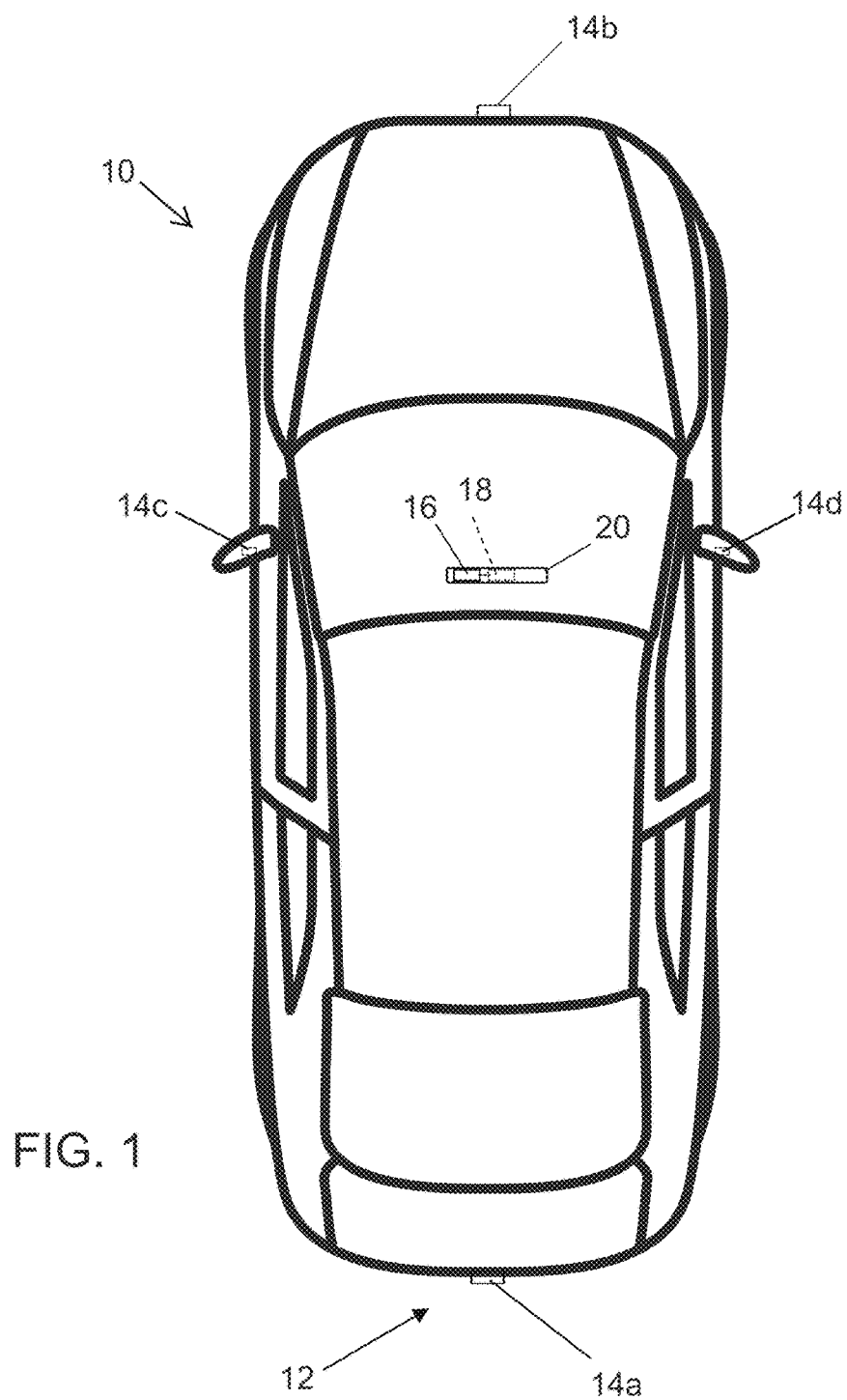
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

With surround view systems, rear view cameras, forward facing cameras and rearview mirror cameras, many views are requested by the OEMs and are considered as useful or of advantage to the driver of the equipped vehicle. These views are shown to the driver of the vehicle on one or several displays. The camera data can also be used to make machine vision and to yield warnings to the driver or to perform autonomous driving.

Figure 2:
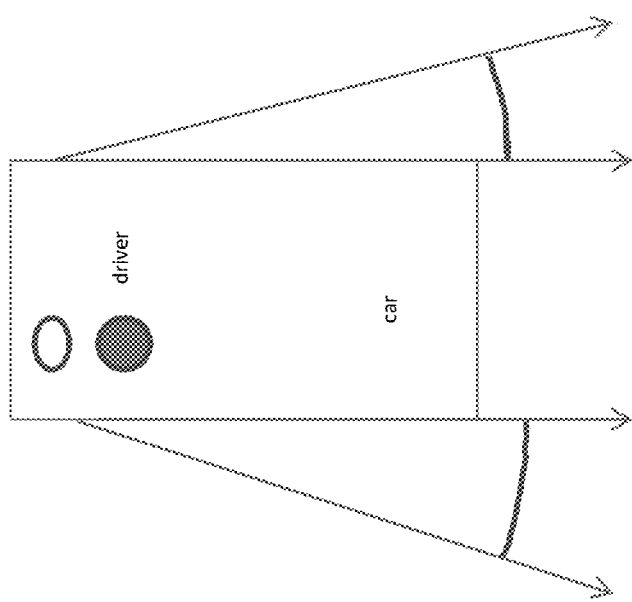
FIG. 2 is a schematic showing the viewing ranges which are legally required for the exterior mirrors at the driver side and passenger side of a vehicle.

As shown in FIG. 2, the viewing ranges which are legally required for the exterior mirrors on the driver side and passenger side of the vehicle extend rearward and partially sideward from the mirror assembly. It is expected that in the future, camera-monitor-systems will be allowed as mirror replacements. Such camera systems will have similar requirements as the mirrors. For example, basic legal requirements for such a system will include:

Minimal field-of-view values;
Minimal Resolution/sharpness of the image; and
Size of the image/minimal angle magnification.

Figure 3:
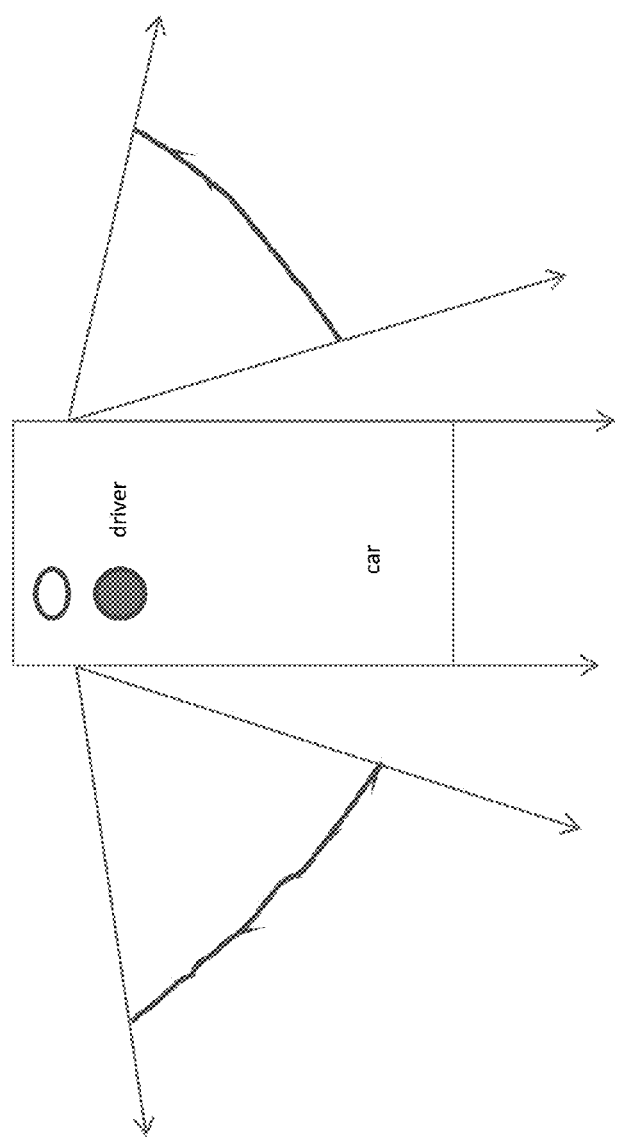
FIG. 3 is a schematic showing the blind spot regions at the driver side and passenger side of the vehicle.

As shown in FIG. 3, the blind spot region is outside or outboard of the legally required viewing range. But the surveillance of these areas is important in special driving situations such as entering the highway or autobahn, switching lanes on the autobahn and overtaking. The region may be displayed together with the mirror view, eventually in a compressed way. Another possibility is machine vision analysis of captured image data to detect objects or other vehicles in the fields of view of the cameras, whereby the system may generate an alarm to the driver.

Figure 4:
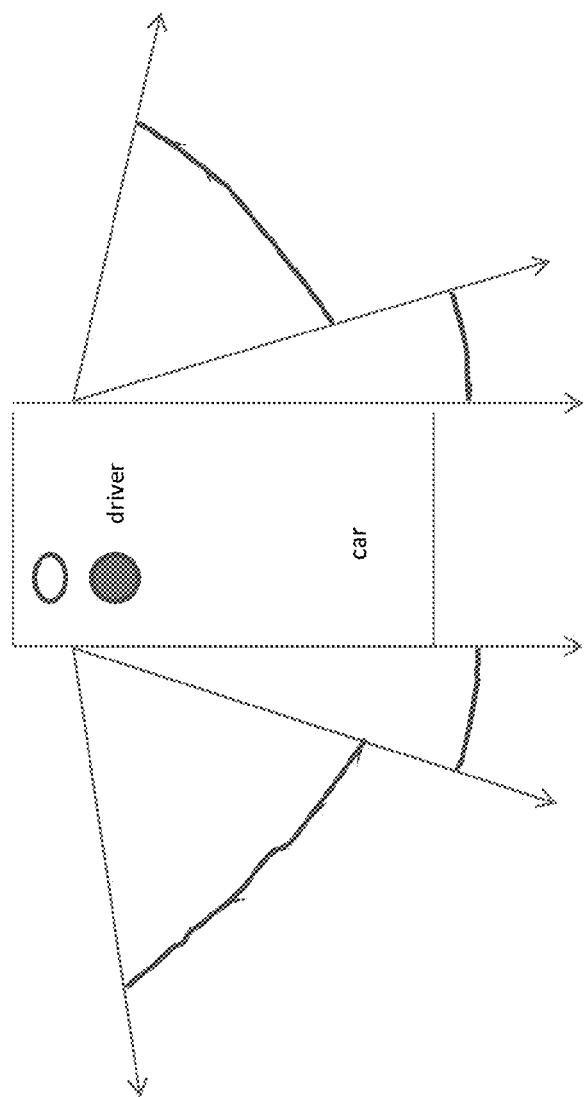
FIG. 4 is a schematic showing a combination of views of the legally required mirror views of FIG. 2 and the blind spot views of FIG. 3.
Figure 11:
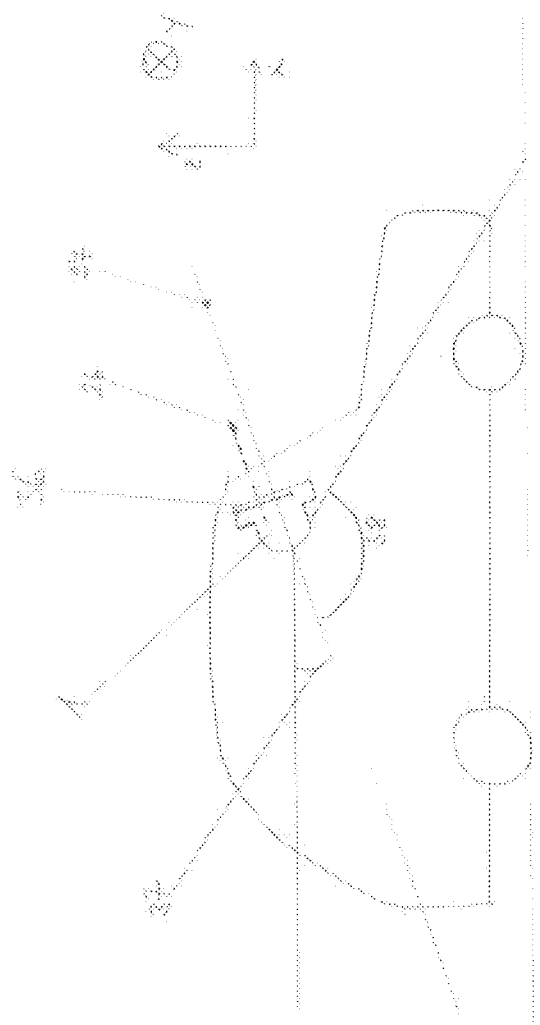
FIG. 11 is a schematic of a single camera vision system.

As shown in FIG. 4, a combination of views includes the legally required mirror views (such as shown in FIG. 2) and the blind spot views (such as shown in FIG. 3) at the sides of the vehicle. A schematic with the same camera with the vehicle as shown from the side is shown in FIG. 11.

Figure 5:
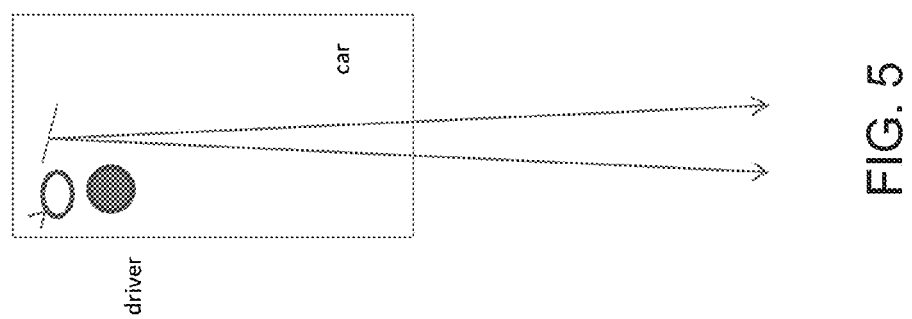
FIG. 5 is a schematic showing the legally required view of the interior rearview mirror assembly of a vehicle.

The legally required view of the interior rearview mirror assembly is shown in FIG. 5. In an application where the mirror is replaced with a camera-monitor-system, the legal requirements remain about the same, and may include:

Minimal field-of-view values;
Minimal Resolution/sharpness of the image; and
Size of the image/minimal angle magnification.

Figure 6:
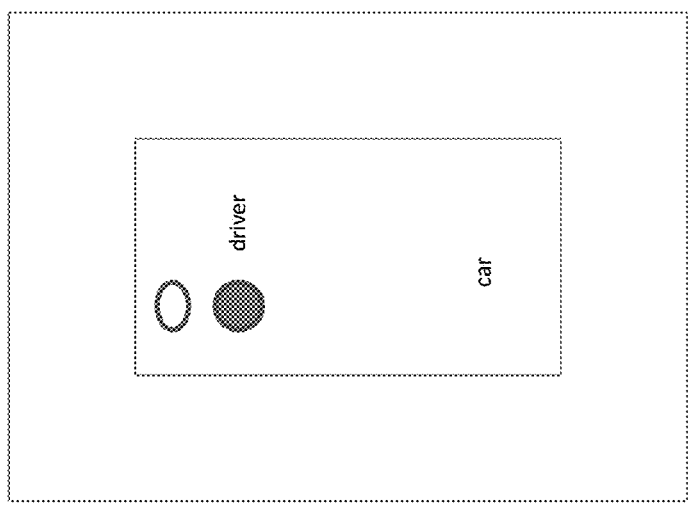
FIG. 6 is a plan view area as created by a surround view system of the present invention.
Figure 7:
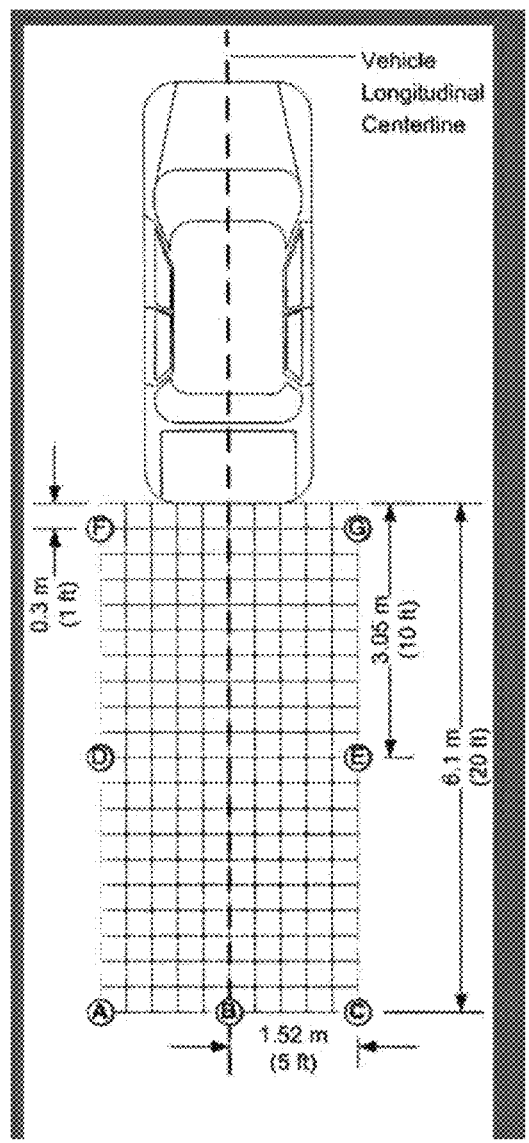
FIG. 7 is a plan view of a legally required rear view area rearward of a vehicle.

FIG. 6 shows the top view area as created by a surround view system. The driver that can view an image as seen by a bird flying about the car. The vision system (utilizing the forward facing camera and a rearward facing camera and other cameras disposed at the vehicle with exterior fields of view) thus may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Figure 8:
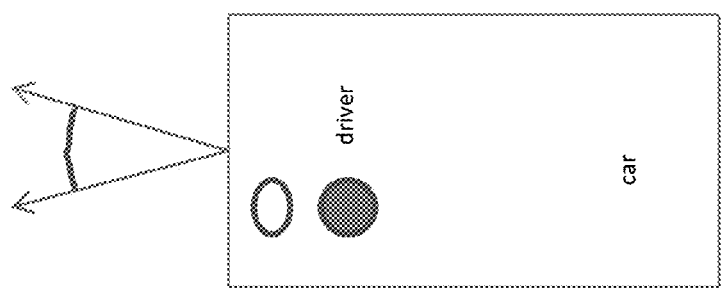
FIG. 8 is a plan view of a vehicle showing a front facing camera system.

As shown in FIG. 8, a front or forward facing camera system may be used for machine vision (where an image processor processes imaged data captured by the forward facing camera to detect objects or lane markers or the like), such as, for example, for lane departure warning, headlight detection, traffic sign recognition and/or the like.

Figure 9:
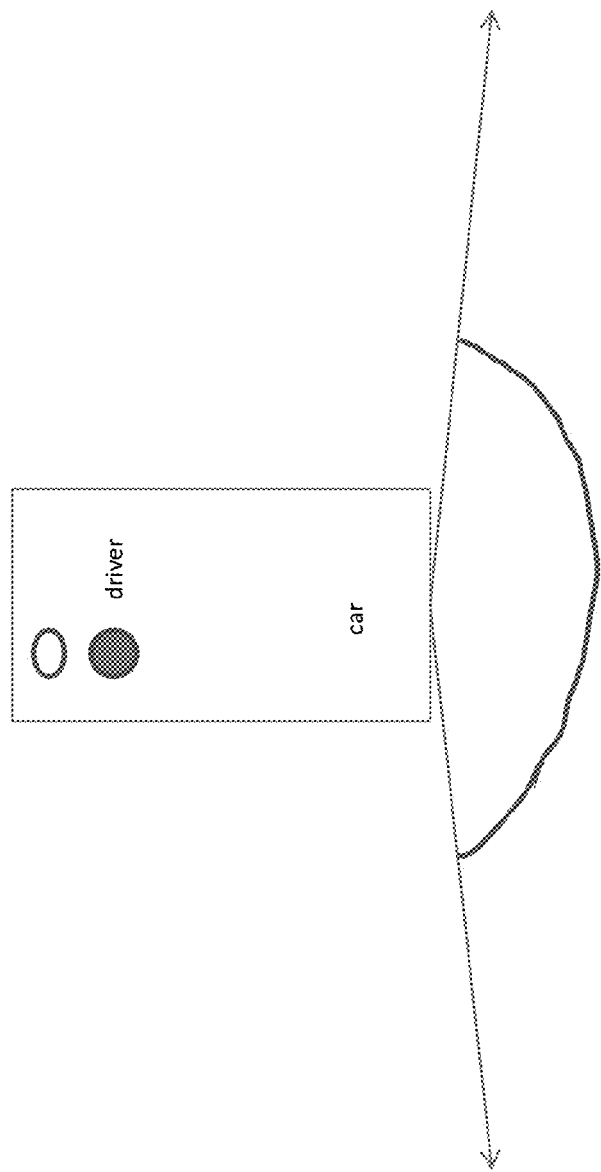
FIG. 9 is a plan view of a vehicle showing a cross-traffic region rearward of the vehicle.

As shown in FIG. 9, a rear camera of the vehicle may encompass a wide region or cross-traffic region. The system may display captured images of the cross-traffic region and/or may generate an alert if objects enter this region, such as when the vehicle is reversing.

Figure 10:
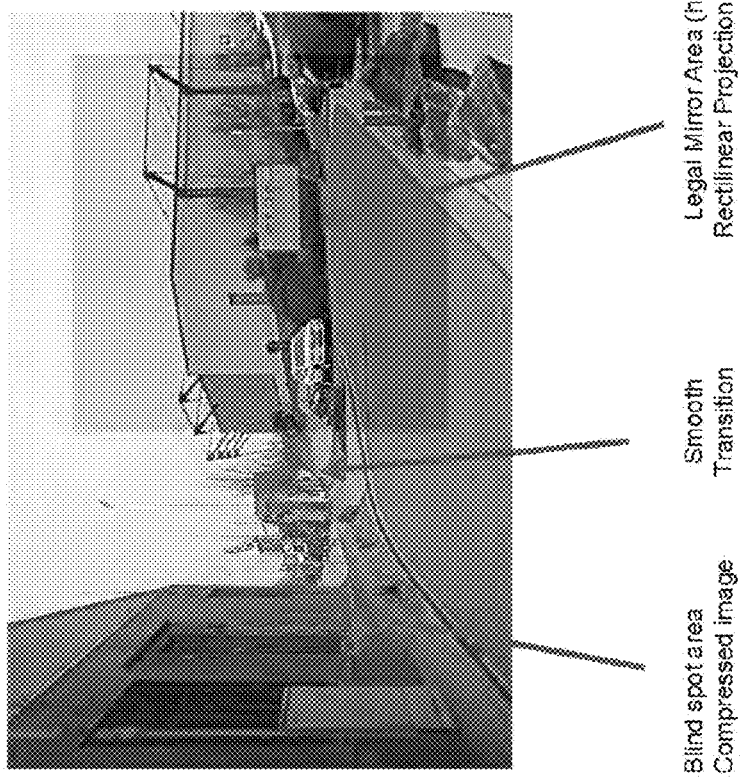
FIG. 10 is an image produced by a single camera capturing the legally required rear view mirror area (gray highlighted box) together with the blind spot area.

FIG. 10 shows an image produced by a single camera lens (such as shown in FIG. 4) capturing the legally required rear view mirror area (the gray highlighted box) together with the blind spot area, which is additionally distorted by image processing for fitting the 19:9 ratio captured image to a 4:3 ratio displayed image without cropping.

Optionally, and as shown in FIG. 11, a vision system may include a single camera solution, such as the types described in International Publication No. WO 2014/204794, which is hereby incorporated herein by reference in its entirety.

Figure 12:
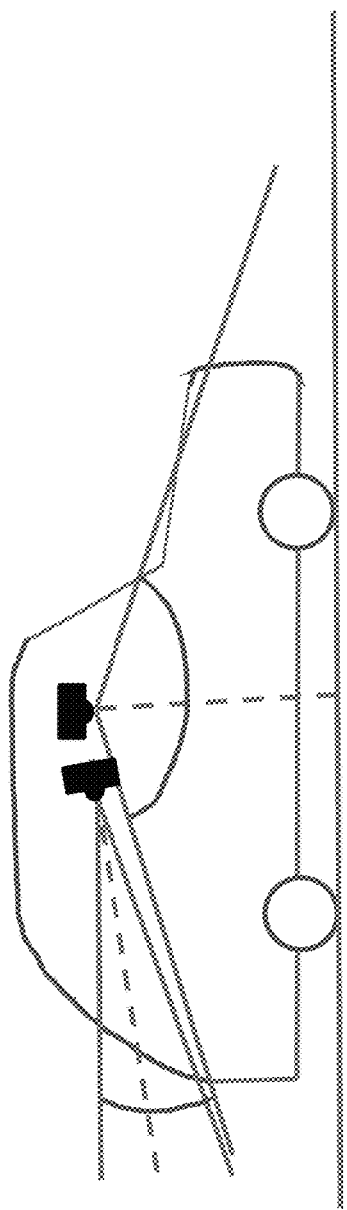
FIG. 12 is a schematic of a vehicle with a side mounted camera system comprising a first camera with a small viewing angle directed rearwardly and a second camera with a wide viewing angle camera directed downwardly.
Figure 13:
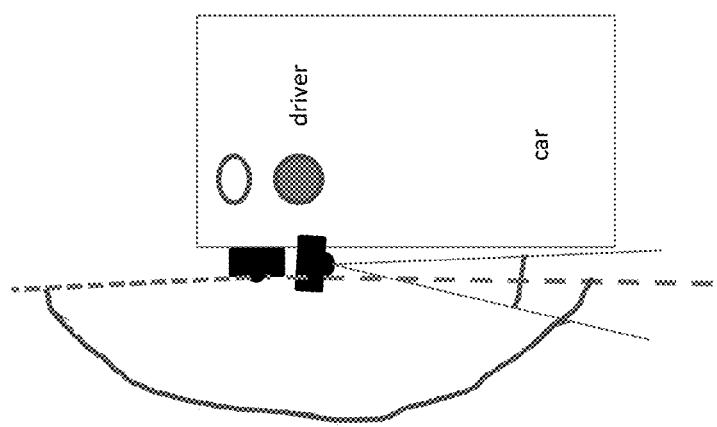
FIG. 13 is a plan view of a vehicle, showing the vehicle camera system of FIG. 12.
Figure 14:
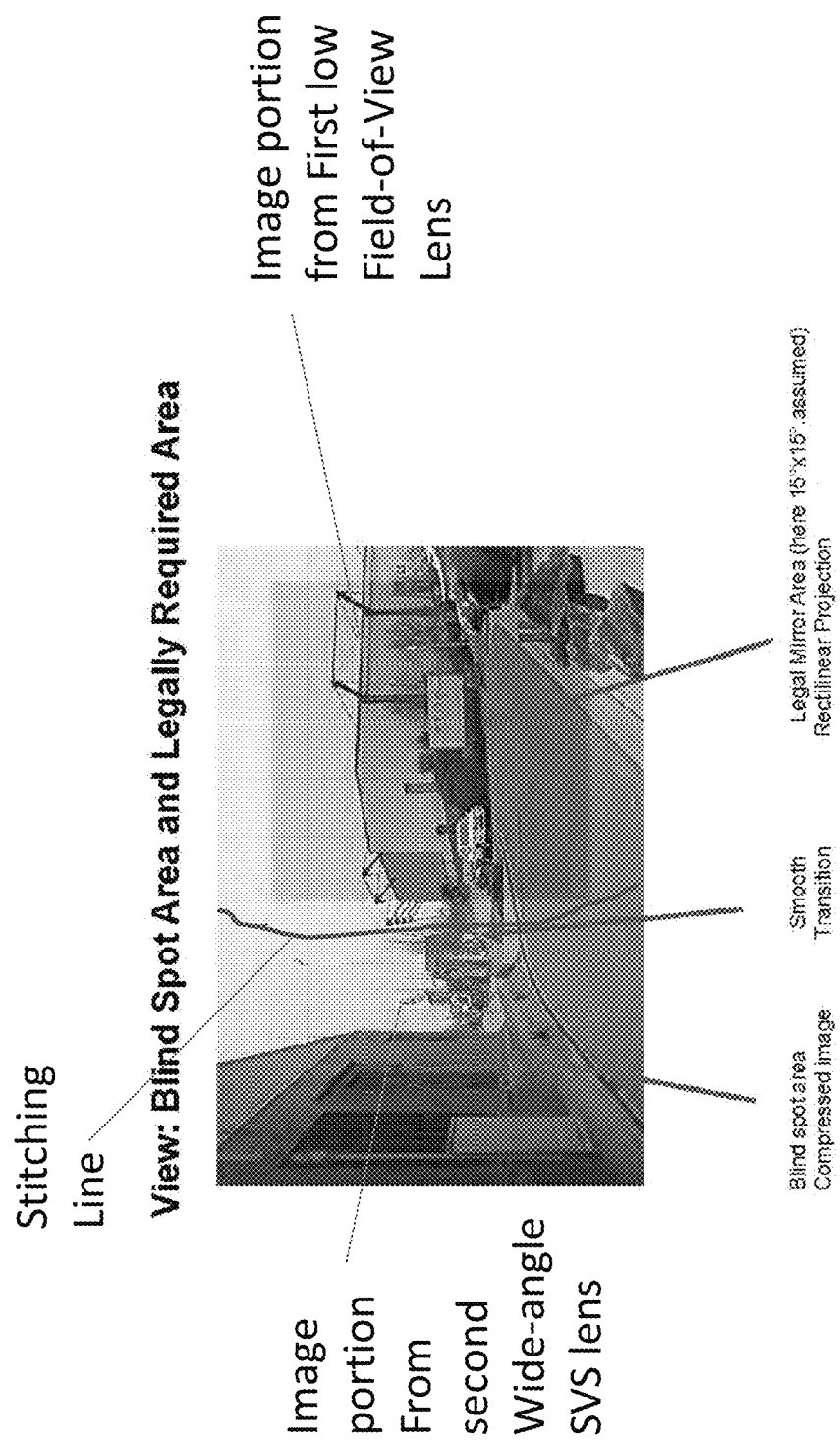
FIG. 14 is an image produced by an image processor stitching the images captured rearward of the vehicle.

Optionally, and such as shown in FIG. 12, a vehicle vision system may include a side mounted camera system comprising a first camera with a small or smaller viewing angle directed generally rearwardly and a second camera with a wide or wider viewing angle directed generally downwardly. A plan view of the vehicle camera system of FIG. 12 is shown in FIG. 13. An image produced by image processing and stitching of images is shown in FIG. 14.

The present invention provides a solution in getting all these views by providing separated cameras for each task. In order to make the system less costly and simpler it is appreciated to fulfil several tasks by a single camera.

As described in International Publication No. WO 2014/204794, for the combination of the legally required rearward mirror view (such as shown in FIG. 2) and the blind spot view (such as shown in FIG. 3), a lens system may be used that achieves both views such as schematically shown in FIGS. 4 and 11. An image captured with such a lens system and a 1.3 Mega Pixel vehicle side camera is shown in FIG. 10. The main aspects are the usage of a high distortion lens and the off-axis mounting of the lens with respect to the imager. The top view or surround view vision function (FIG. 6) may not be covered by this device. For this purpose an additional lens with high viewing angle at the vehicles side is used.

As described in International Publication No. WO 2014/204794, these three tasks can be fulfilled by a single lens instead of a combination (see FIG. 11). The problem with this solution is the need for a high resolution imager with many megapixels and a lens with extremely high distortion.

Figure 15A:
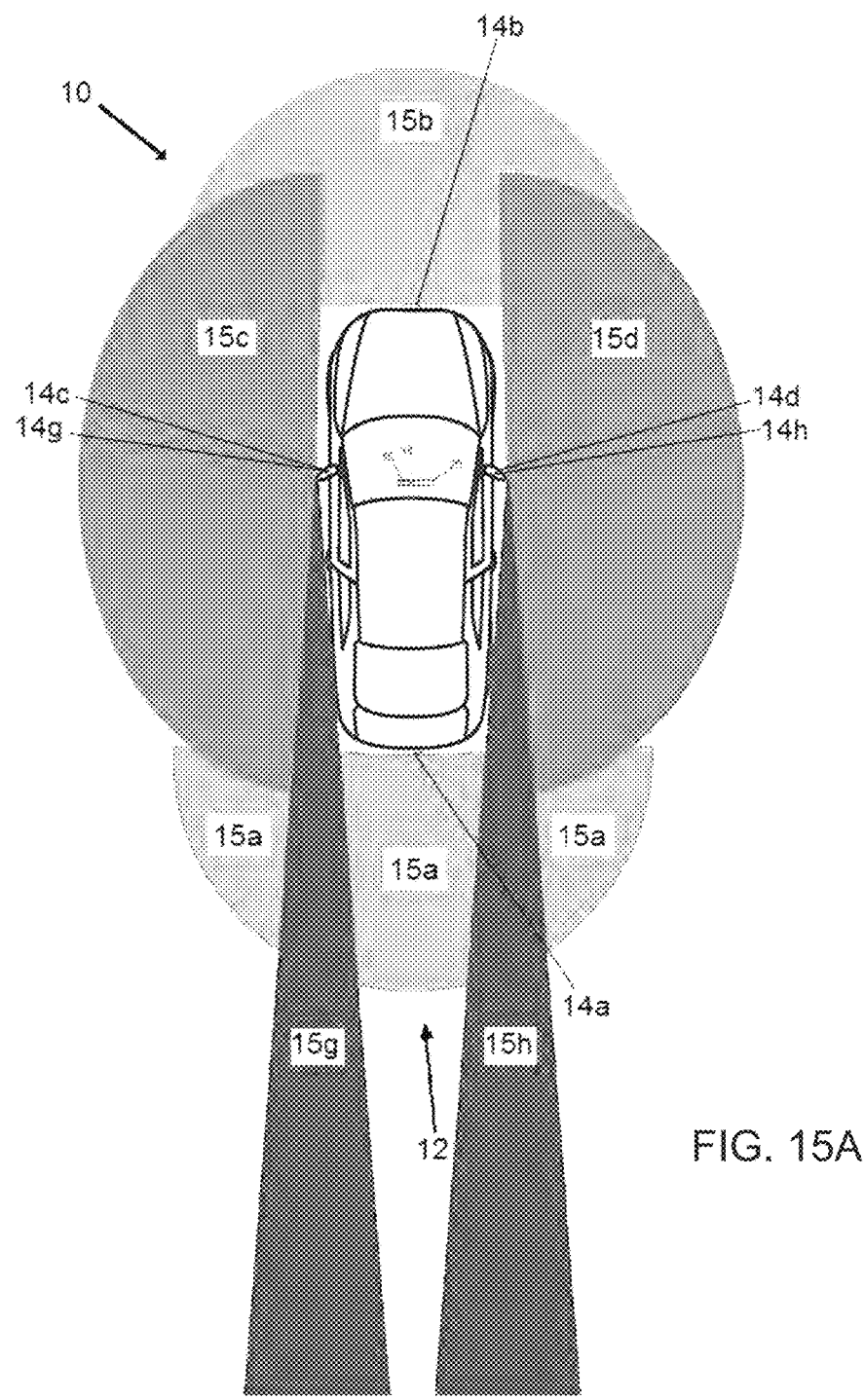
FIG. 15A is a plan view of a vehicle having four surround view fish eye lens cameras in combination with two side-mounted rear view vision cameras for capturing images surrounding and rearward of the vehicle.

For overcoming these disadvantages, the present invention provides a different solution. For example, and such as shown in FIGS. 12 and 13, a new combination of a side-mounted 180 degree field of view (or other wide angle field of view) lens and camera (top view) having the principal axis of its field of view directed generally downward and sideward (such as at cameras 14c and 14d in FIG. 15A) and an exterior rearview mirror lens and camera with moderate or narrower viewing angle having the principal axis of its field of view directed generally rearwardly (such as cameras 14g and 14h in FIG. 15A). The advantages include:

use of a standard low viewing angle lens to capture the legally required image area;

use of a wide angle lens for the top view application and the blind spot area; and create an image via dewarping and stitching such as shown in FIG. 14.

Figure 15B:
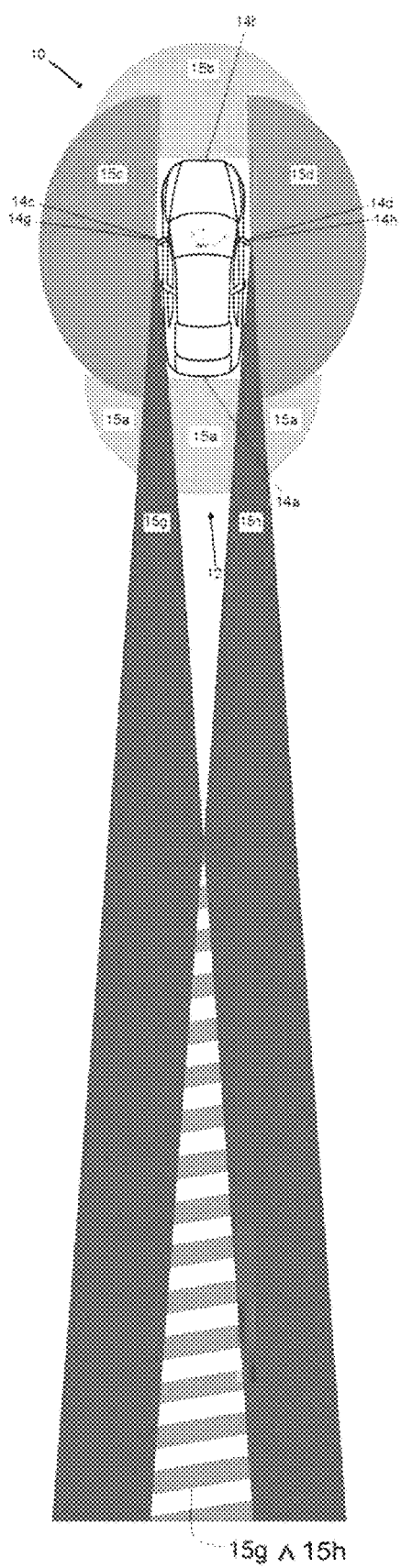
FIG. 15B is a plan view of a vehicle having similar cameras as shown in FIG. 15A, shown at a further distance, where the rear vision cameras have an area as seen by the left and right side-mounted rear vision cameras.
Figure 16:
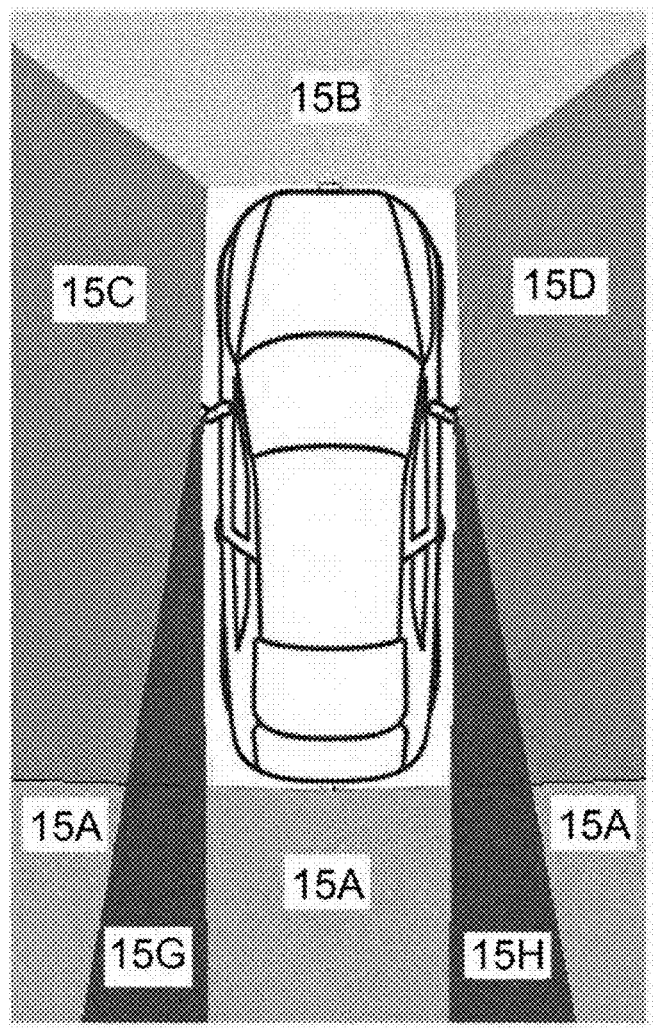
FIG. 16 is a plan view of the vehicle of FIG. 15, showing the areas or regions encompassed by the multiple cameras.

This combination of cameras can also serve as input to a surround vision system (SVS) top view system having six cameras such as shown in FIGS. 15 and 16.

Figure 17A:
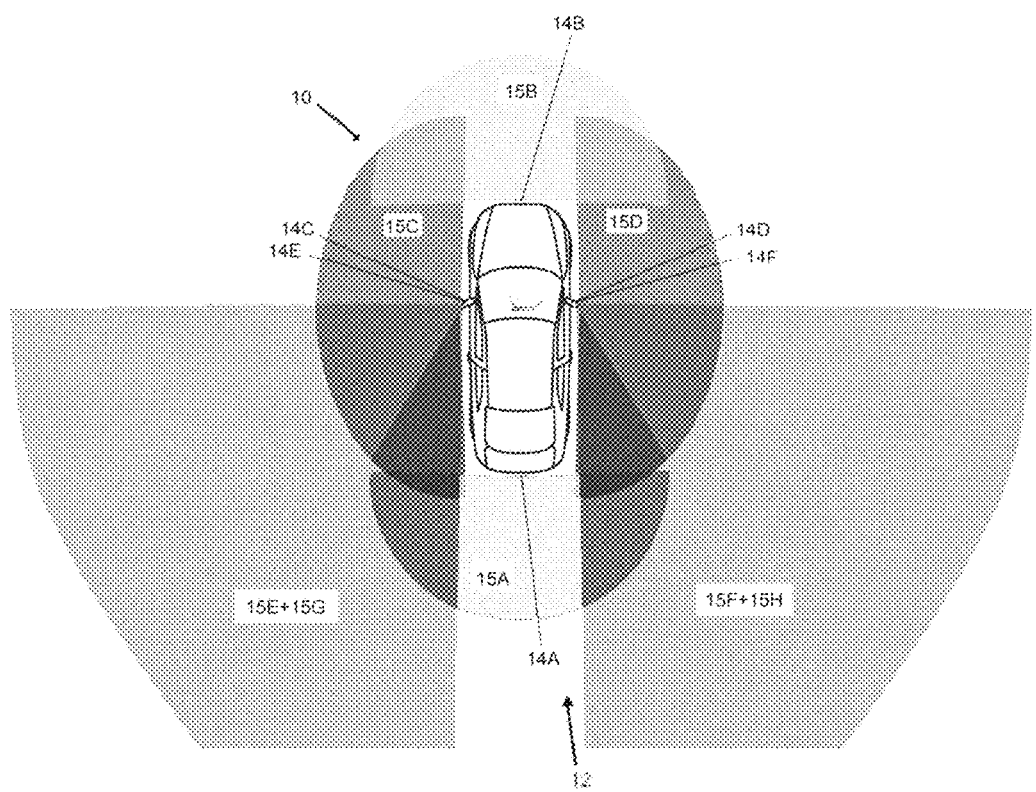
FIG. 17A is a plan view of another vehicle having multiple cameras for capturing images surrounding the vehicle, with the side-mounted rear vision cameras and blind spot cameras are combined as one camera at each vehicle side, and additionally there are four fish eye surround view cameras.
Figure 17B:
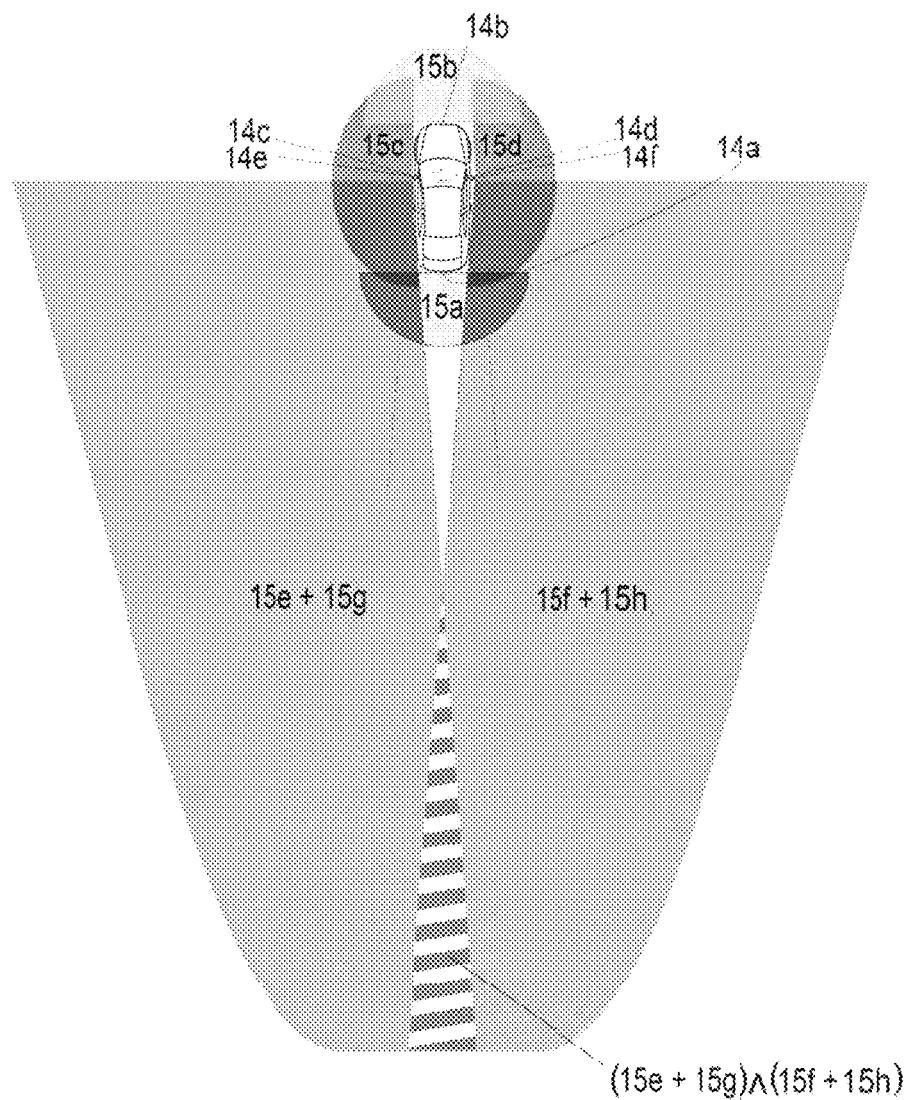
FIG. 17B is a plan view of a vehicle having similar cameras as shown in FIG. 17A, shown at a further distance, with the combined side view cameras having a portion of the rear view overlapping at the vehicle's rearward center beginning from a distance of about 20 m.
Figure 18:
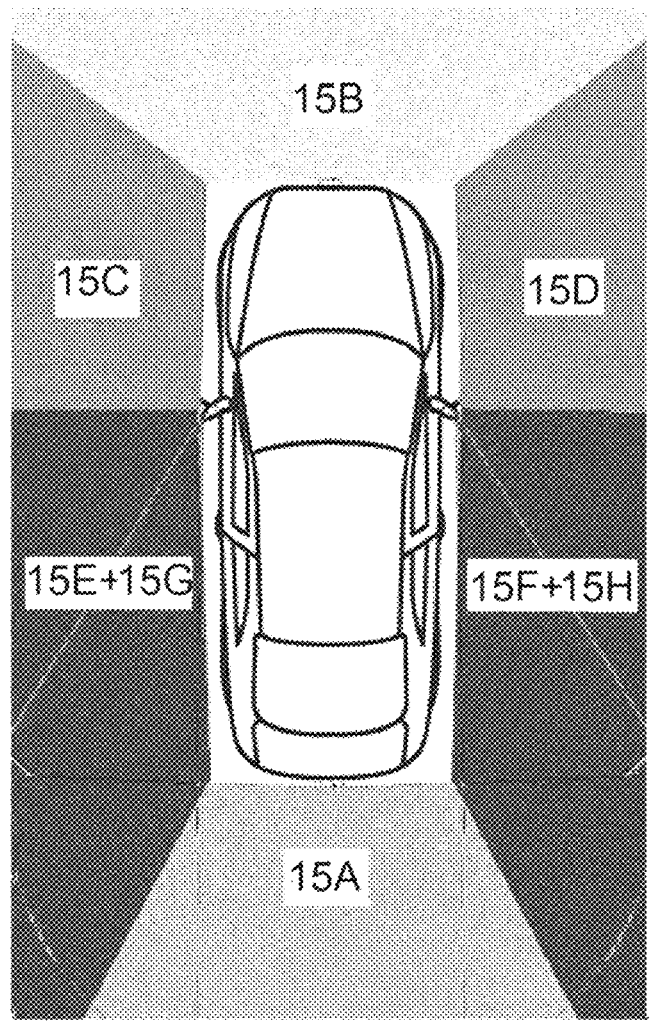
FIG. 18 is a plan view of the vehicle of FIG. 17, showing the areas or regions encompassed by the multiple cameras.

As another optional solution, the side view cameras 14f and 14e having blind spot viewing areas 15e and 15f and required rearward viewing areas 15g and 15h are combined in one camera at each side of the vehicle, thereby producing an image such as shown in FIG. 10. Optionally, and such as suggested in International Publication No. WO 2014/204794, the cameras may be combined with side view fish eye cameras 14c and 14d (with the viewing areas such as 15c and 15d) for generating a virtual top view image together with a fish eye front 14b and rear 14a camera (see FIG. 17). Optionally, the front fish eye camera 14b may be split into two cameras with about a 120 degree opening angle, directed toward the front right and front left of the vehicle. In the following, camera 14b is referred to as a single camera, but all optional configurations may have a split or dual front camera 14b as an alternative option. Optionally, a virtual top down or surround image or view, such as shown in FIG. 18, may be generated out of these six camera images stitched of the area of maximum resolution.

Figure 19:
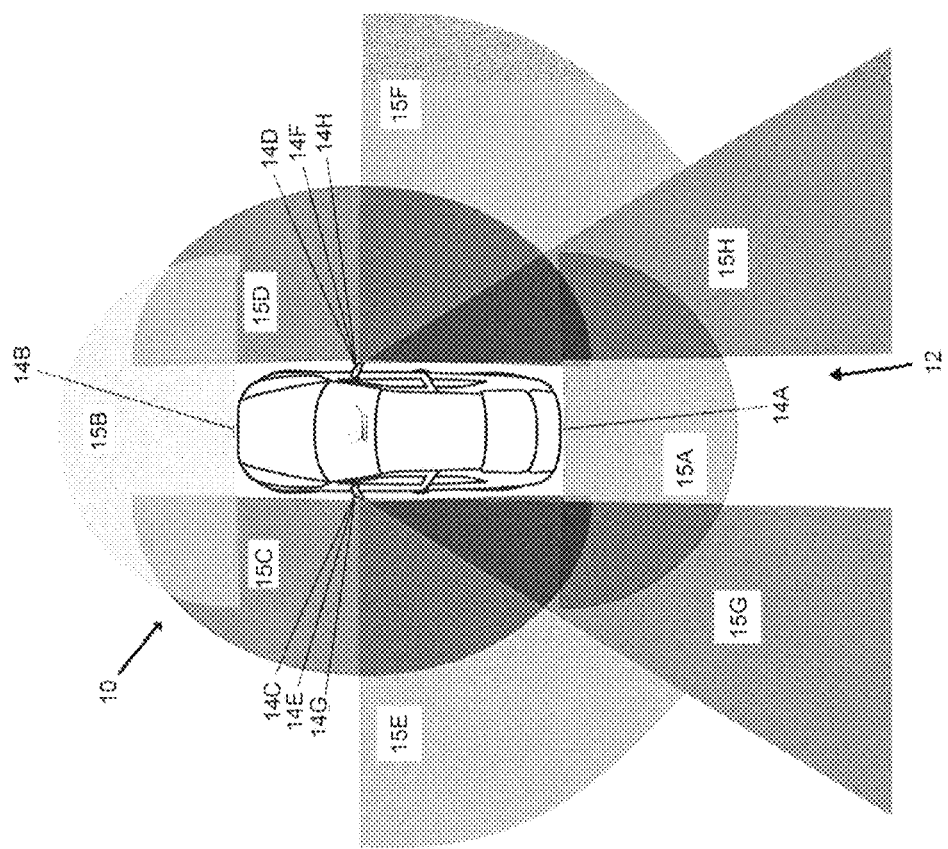
FIG. 19 is a plan view of another vehicle having multiple cameras for capturing images surrounding the vehicle.
Figure 20:
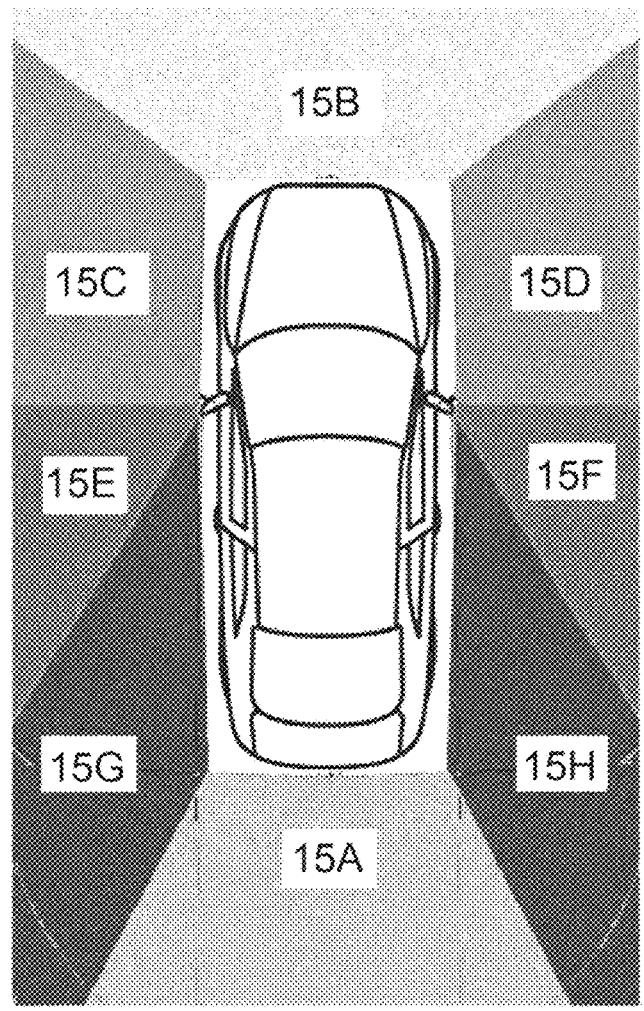
FIG. 20 is a plan view of the vehicle of FIG. 19, showing the areas or regions encompassed by the multiple cameras.
Figure 21:
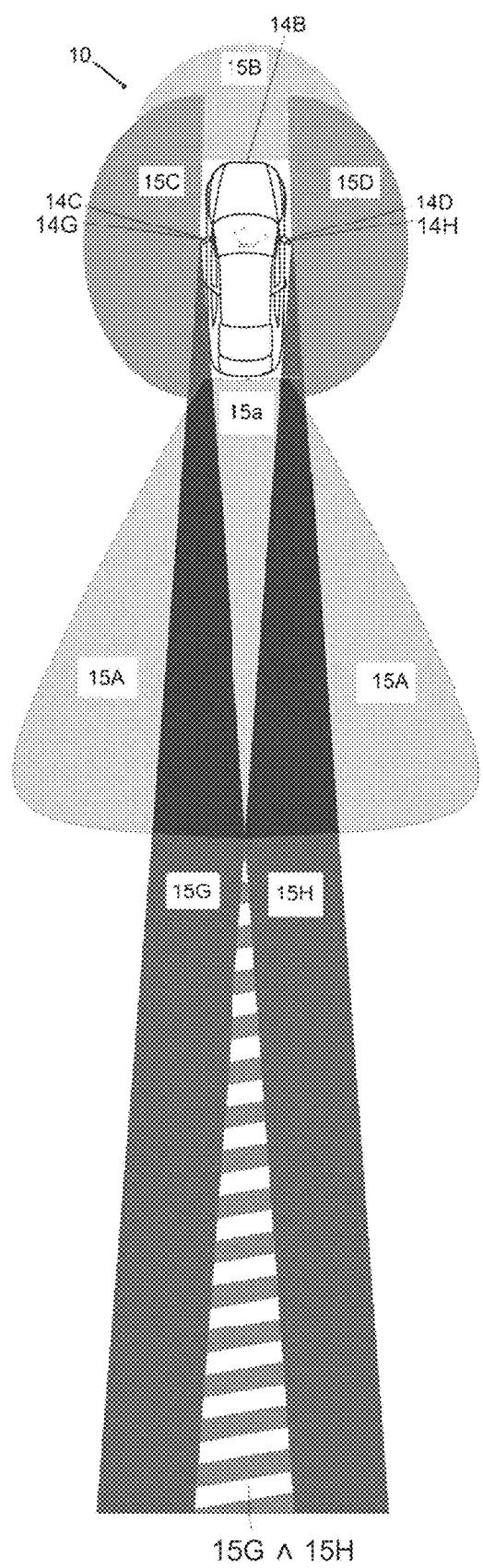
FIG. 21 is a plan view of another vehicle having multiple cameras for capturing images surrounding the vehicle, with the side mounted rear vision cameras (without extra blind spot viewing area) at each vehicle side and showing a portion of the rear view overlapping at the vehicle's rearward center beginning from a distance of about 20 m, and additionally a rear view high distortion lens camera is attached having a rearward view with elevated pixel resolution in the horizontal view.
Figure 22:
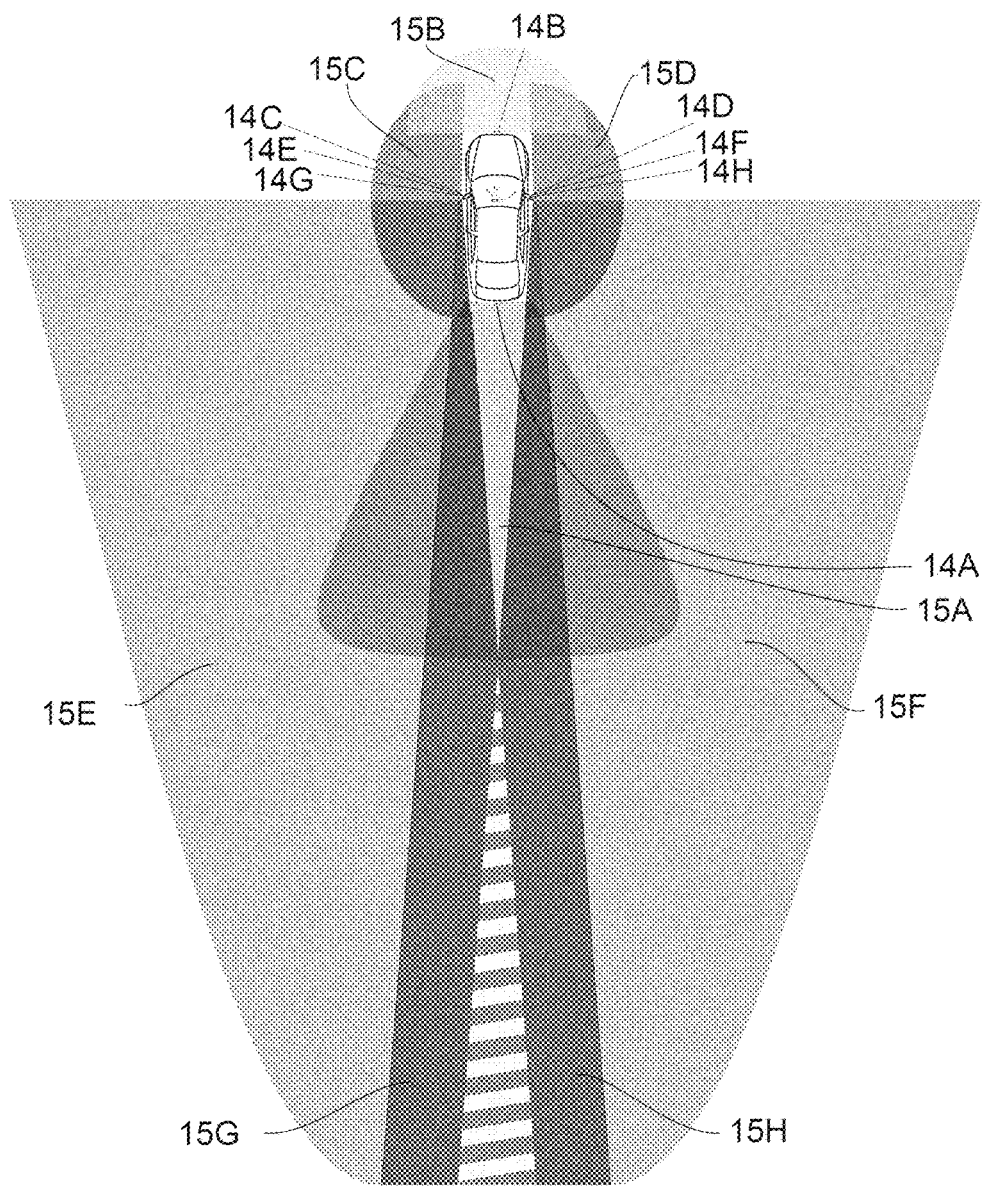
FIG. 22 is a plan view of another vehicle having multiple cameras for capturing images surrounding the vehicle similar to FIG. 21, having an additional pair of side-mounted cameras capturing the blind spot area sidewardly and rearwardly of the vehicle.
Figure 23:
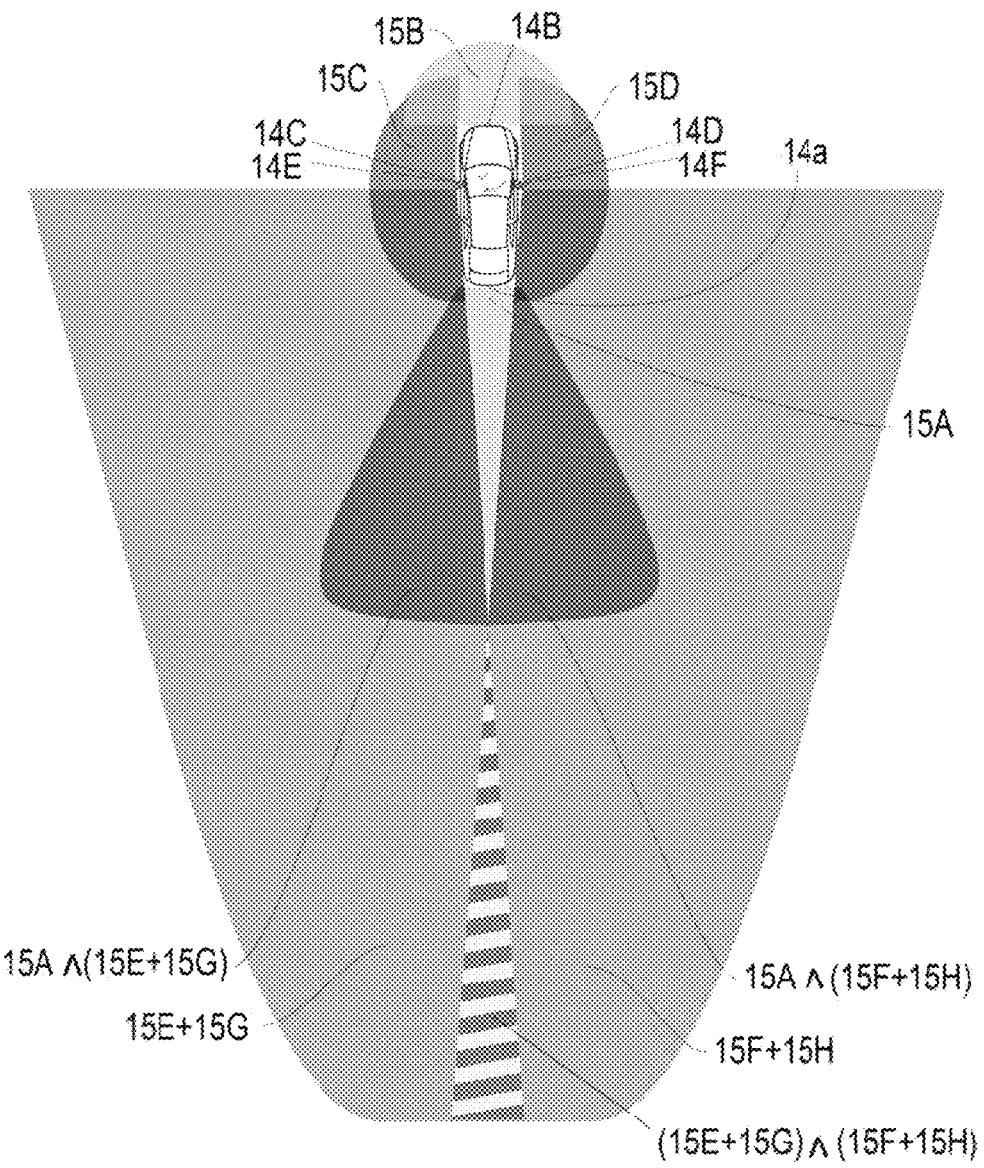
FIG. 23 is a plan view of another vehicle having multiple cameras for capturing images surrounding the vehicle similar to FIG. 22, with the exception that the blind spot cameras and rearview cameras are merged into one camera each.

As another option, there may be two separate cameras (such as camera 14e separate from camera 14g and camera 14f separate from camera 14h) for detecting the blind spot areas 15e (with camera 14e) and 15f (with camera 14f) and the rear view areas 15g (with camera 14g) and 15h (with camera 14h) at each vehicle side. The blind spot and rear view cameras 14e, 14f, 14g, 14h may have normal lenses (with the principal axis of the fields of views directed sidewardly and/or rearwardly depending on the particular application of the camera). A top view image stitched out of the eight camera's captured images, such as shown in FIG. 20, with camera viewing areas such as shown in FIG. 19 may be generated by image computing or processing of the image data captured by the cameras 14e (blind spot), 14f (blind spot), 14g (rear view/mirror view), 14h (rear view/mirror view) together with four fish eye surround view cameras 14a (rear), 14b (front), 14c (left) and 14d (right).

The top view image generated by both optional solutions with 6 or 8 cameras is superior to conventional four camera top view systems since the rear sideward areas 15g and 15h are much better captured by the rearward orientated cameras 14e, 14g or cameras 14f, 14h or combined than by any side fisheye camera 14c and 14d. As another optional aspect of the present invention, the vision system may provide stereo rear vision data of the area captured by the rearwardly facing cameras 14a, 14g and 14h or cameras 14e and 14f. In practice, the stereo image computation of camera positions in different distances to the viewed scene is comparably complex. The rearwardly directed fisheye camera 14a may not be considered as stereo image source due to high distortion and low resolution towards the rear horizontal area. The side-mounted cameras may both have a substantially identical distance to the scene behind the vehicle such as can be seen at 15g and 15h in FIG. 15B. At a distance of about a vehicle length behind the subject vehicle, the views 15g and 15h begin to overlap (see striped region in FIG. 15B). Optionally, both have a combined view (15e+15g and 15f+15h) or rearward view (15g, 15h) combined with the blind spot view (15e, 15f), produced by a camera (such as in accordance with International Publication No. WO 2014/204794, incorporated above), and such as shown in FIG. 17B.

Figure 24:
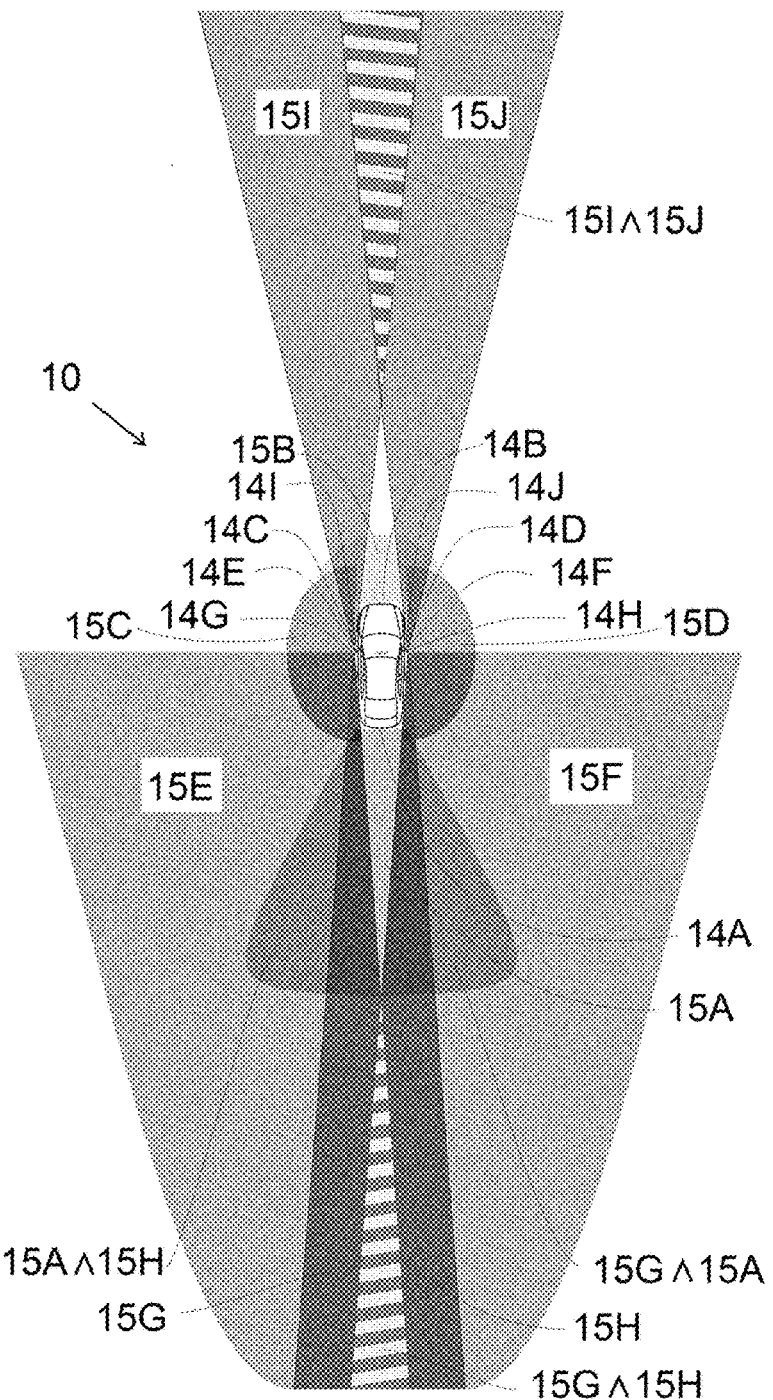
FIG. 24 is a plan view of another vehicle having multiple cameras for capturing images surrounding the vehicle including two forward viewing cameras disposed at a side region of the vehicle.
Figure 25:
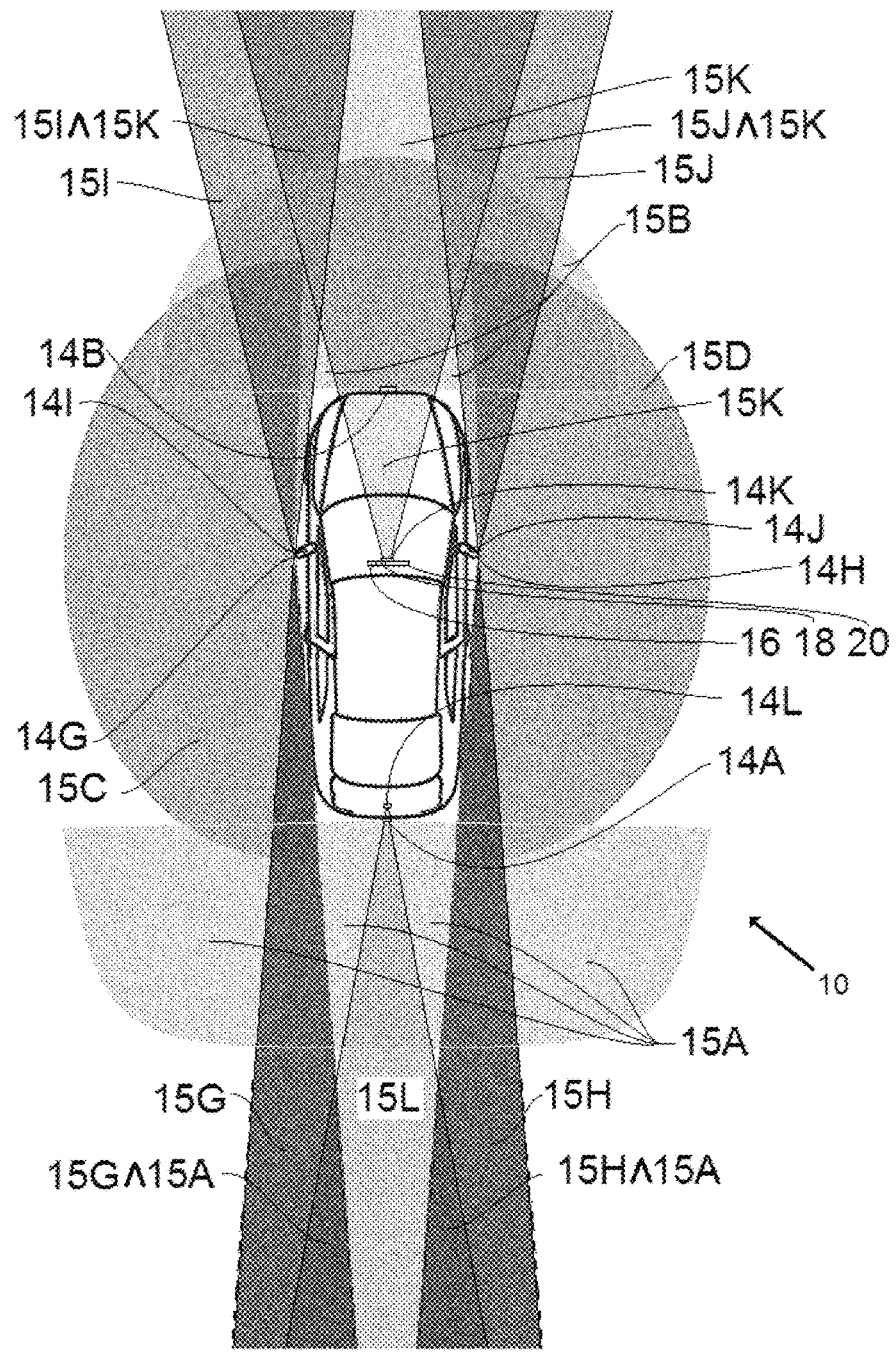
FIG. 25 is a plan view of another vehicle having multiple cameras for capturing images surrounding the vehicle similar to that of FIG. 24, and including a forward viewing camera disposed at a windshield of the vehicle and a centrally located rearward viewing camera having a narrower field of view rearward of the vehicle.
Figure 26:
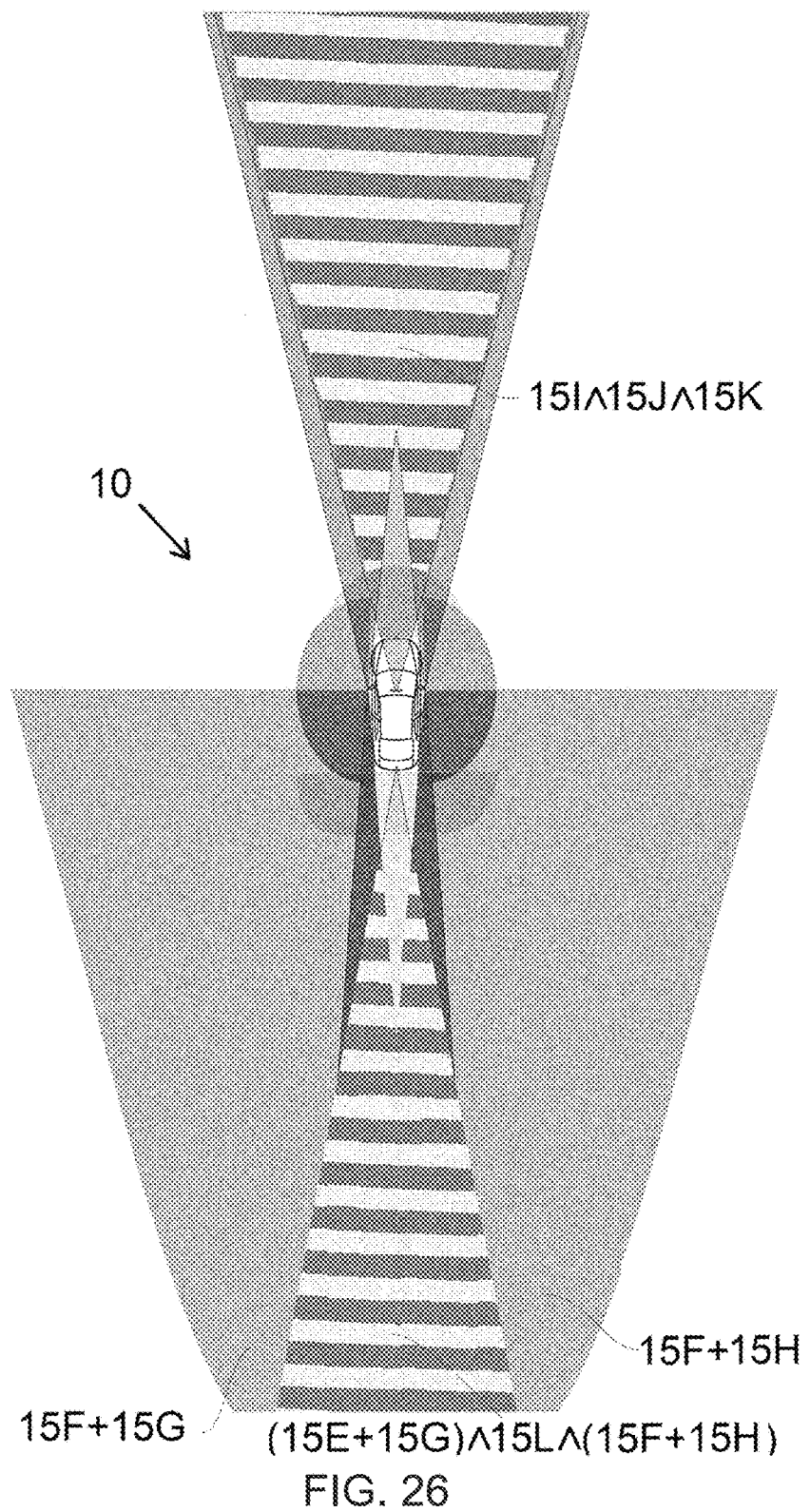
FIG. 26 is a plan view of the vehicle of FIG. 25, showing the overlapping fields of view of the cameras.

As shown in FIG. 24, the system may optionally and additionally comprise two forwardly directed (forward vision) cameras at the vehicle's side, optionally mounted in wing-like structures at the position where conventional side mirrors are mounted normally. Each side's wing may house multiple (e.g., four) cameras of the system according to the invention, such as optionally a surround view fish eye camera, optionally a rearwardly directed rear view (mirror replacement) camera, optionally a blind spot camera and optionally a forward vision camera. Both forward vision cameras may have an overlapping zone in front of the vehicle. Since both cameras sit at the maximal width extent of the vehicle, the stereo disparity is maximal at a limited imager pixel resolution of, for example, about 2 Mega Pixels. As shown in FIG. 25, the system has an additional forward vision camera at the inner rearview mirror region directed in the forward direction. Additionally, the system in FIG. 25 has an additional center rear view camera with a normal lens (such as a lens having about a 50 mm focal length), optionally integrated into the third or center mounted brake light. The additional center rear view camera 14L has a narrower field of view as compared to the wide angle field of view of the wide angle rear camera 14a. For example, the rear camera 14A may have a wide angle field of view of near 180 degrees or thereabouts (such as greater than at least 150 degrees), while the rear camera 14L may have a field of view rearward of the vehicle of less than about 60 degrees or less than about 30 degrees or thereabouts. The striped regions of FIG. 26 indicate the regions that are captured by at least two of the three forward cameras or at least two of the three rear view cameras. The field of view 15L of the rear narrower field of view camera extends beyond the ground region 15A encompassed by the rear wide angle camera.

Figure 27:
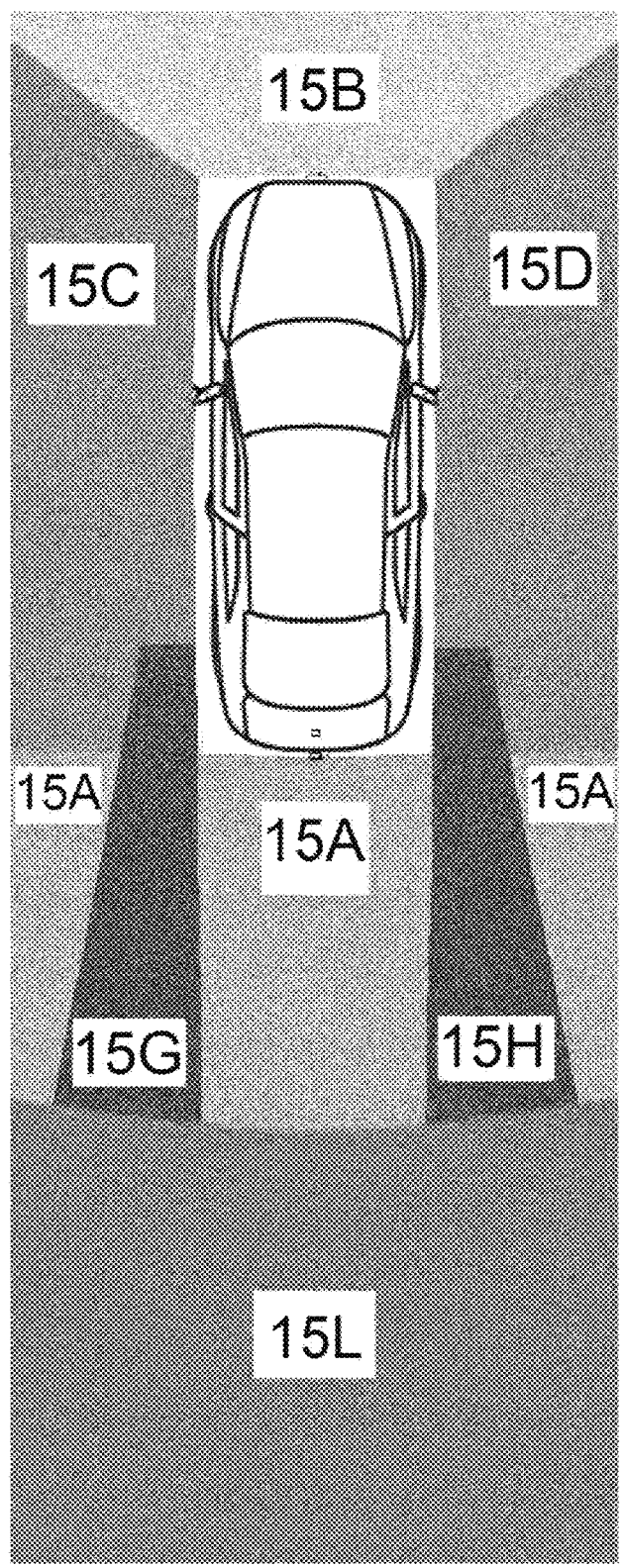
FIG. 27 shows an optional top view image camera source scheme of another surround view system for a vehicle in accordance with the present invention.

As shown in FIG. 27, the system may optionally provide a top view image camera source scheme of a surround view system for a vehicle, with the images having a substantially larger extent to the rear than to the sides and front of the vehicle. The far rear image content is produced by a rearwardly directed normal viewing angle (such as a camera having a narrower field of view than the wide angle rearward camera 14a, such as a field of view of less than about 100 degrees or less than about 45 degrees or less than about 30 degrees, as compared to the wide angle field of view of greater than about 150 degrees or about 180 degrees) camera 14L (having field of view 15L that extends beyond the ground region 15A encompassed by the rear wide angle camera), and the closer rear region 15A being produced by either just rear wide angle camera 14A or optionally by combining the views of camera 14A (view 15A), camera 14G (view 15G) and camera 14H (view 15H).

Optionally, the stereo rear vision may be used for 3D rearview vision or 3D rear panorama vision view generation or by visual 3D object (rear) distance ranging. Optionally, object highlighting and overlay scaling the distance or overlays showing colors corresponding to the object's distance and/or relative speed may be employed. Optionally, machine vision and vehicle control algorithms may be fed by that object information for further processing.

As can be seen in FIGS. 15B, 17B, 21-24 and 26, the area in the direct near region behind the vehicle is just captured by rear camera 14a (view 15a). The area where the cameras' views overlap (15e+15g) ∧ (15f+15h) or 15g ∧ 15 and by that where stereo vision computing is possible may begin at a distance of about 20 m behind the vehicle (highlighted by stripes). Objects at a distance closer than that (such as, for example, within about 10 m or so) may be estimated by a rear mono camera (14a) back projection or by structure from motion or by a combination of both. Optionally, a new type of rear view vision camera with a height distortion tilt-shift lens (along the short side of the imager, with the imager's long side mounted horizontally) may be used (see FIGS. 21-23), such as by utilizing aspects of the systems described in U.S. patent application Ser. No. 14/852,950, filed Sep. 14, 2015, which is hereby incorporated herein by reference in its entirety.

Optionally, by having two (or more) cameras viewing the same region (at a region or regions rearward of the vehicle), the system may provide stereo vision and/or may optionally employ super resolution of captured images or optionally may comprise a panoptic camera system possibly being processed as a Stanford light field by utilizing aspects of the systems described in U.S. Publication No. US-2014-0168415, which is hereby incorporated herein by reference in its entirety. The light field may feed a stereoscopic, holographic display or may feed a light field display for enabling 3D viewing of the vehicle's surround or rear, front, blind spot or top view vision by the driver. Optionally, the processed panoptic light field may be fed to a machine vision driver assistance system of the vehicle.

These cameras provide a rearward view that has a higher pixel per degree density in the rearward horizontally center which is beneficial for human- and machine vision to see objects at the semi distant rearward region, such as about 5 m to about 10 m rearward of the vehicle. A vision generation (such as described in U.S. patent application Ser. No. 14/852,950, filed Sep. 14, 2015, incorporated above) using imposters positioned at the closest objects distance may come into use in combination with using stereo vision view (coming from the side cameras) when the closest objects are further than about 20 m from the rear of the vehicle. Alternatively, the rear view panorama stitching area may be adapted according to the closest object in view distance. For far [object-] distances, just the side cameras may provide the rear view panorama image with the rear camera 14a not reflected or just at the bottom area. For close [object-] distances, the side cameras may provide the side areas of the stitched rear view panorama image and the rear camera 14a may provide the center of the view optionally under use of imposters.

Therefore, the present invention provides a multi-camera vision system having a plurality of cameras configured to be disposed at a vehicle so as to have respective fields of view exterior of the vehicle. The plurality of cameras, when disposed at the vehicle, comprises (i) a driver-side wide angle camera 14c disposed at a driver-side location and having a wide angle generally downward field of view (such as by having its principal axis of its field of view directed generally downwardly and sidewardly) at the driver side of the vehicle, with the wide angle generally downward field of view of the driver-side wide angle camera encompassing a region forward of the vehicle and a region rearward of the vehicle (such as region 15c in FIGS. 15A and 15B), (ii) a driver-side rearward viewing camera disposed at or near the driver-side location 14g and having a field of view (see 15g) along the driver side of the vehicle rearward of the vehicle, (iii) a passenger-side wide angle camera 14d disposed at a passenger-side location and having a wide angle generally downward field of view (such as by having its principal axis of its field of view directed generally downwardly and sidewardly) at the passenger side of the vehicle, with the wide angle generally downward field of view of the passenger-side wide angle camera encompassing a region forward of the vehicle and a region rearward of the vehicle (such as region 15d in FIGS. 15A and 15B), (iv) a passenger-side rearward viewing camera 14h disposed at or near a passenger-side location and having a field of view (see 15h) along the passenger side of the vehicle and rearward of the vehicle, (v) a rear camera 14a disposed at a rear portion of the vehicle and having a wide angle generally downward field of view 15*a* (such as by having its principal axis of its field of view directed generally downwardly and rearwardly) rearward of the vehicle, and (vi) a front camera 14*b* disposed at a front portion of the vehicle and having a wide angle generally downward field of view 15*b* (such as by having its principal axis of its field of view directed generally downwardly and forwardly) forward of the vehicle.

The side rearward viewing cameras and side wide angle cameras may be disposed at or in an exterior rearview mirror assembly of the vehicle at the respective side of the vehicle. The location of the side rearward viewing camera is preferably outboard of the side of the vehicle (such as at an outboard region of the exterior mirror) so that the field of view of the rearward viewing camera may encompass a region rearward of the vehicle. For example, and such as shown in FIG. 15B, the rearward fields of view 15*g*, 15*h* of the side rearward cameras 14*g*, 14*h* encompass an a rear rearward of the vehicle and overlap one another at a distance rearward of the vehicle. The rearward field of view of the side rearward viewing camera 14*g*, 14*h* may encompass a region at least 20 meters rearward of the vehicle, while the rear camera 14*a* may be directed generally downward and may have a field of view that does not encompass such a distance from the vehicle. The rearward field of view of the driver-side rearward viewing camera overlaps the rearward field of view of said passenger-side rearward viewing camera rearward of the vehicle, such as at a distance rearward from the rear of the vehicle.

The front, rear, and side wide angle cameras have wide angle lenses (such as fisheye lenses) that provide a wide angle field of view at the respective area, such as about 180 degrees at the front, rear and side regions of the vehicle. The side rearward viewing cameras have a narrower angle lens that provides less distortion and enhanced resolution at greater distances (such as a lens having a field of view of less than about 60 degrees, such as less than about 45 degrees, such as less than about 30 degrees or thereabouts).

The system includes a control having an image processor operable to process image data captured by all of the cameras, and includes a display operable to display images derived from image data captured by at least some of the cameras. The display is selectively operable to display images derived from image data captured by all of the cameras. The image processor is operable to process image data captured by at least some of the cameras (such as the front, rear and side wide angle cameras) to detect objects in the field of view of the at least some of the cameras.

Optionally, the field of view the side rearward viewing cameras encompass a blind spot region at the respective side of the vehicle. Optionally, the vision system may include (i) a driver-side blind spot viewing camera disposed at or near the driver-side location of the vehicle and having a field of view that encompasses a blind spot region at the driver side of the vehicle and (ii) a passenger-side blind spot viewing camera disposed at or near the passenger-side location of the vehicle and having a field of view that encompasses a blind spot region at the passenger side of the vehicle. The fields of view of the side rearward viewing cameras are rearward of the fields of view of the respective side blind spot viewing cameras, and the fields of view of the side blind spot viewing cameras are laterally outboard of the fields of view of the respective side rearward viewing cameras. Optionally, the driver-side rearward viewing camera, the driver-side wide angle camera and the driver-side blind spot viewing camera may all be disposed in a driver-side exterior rearview mirror assembly of the vehicle, while the passenger-side rearward viewing camera, the passenger-side wide angle camera and the passenger-side blind spot viewing camera may all be disposed in a passenger-side exterior rearview mirror assembly of the vehicle.

The individual cameras or sensors may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the imaging device and control and image processor and any associated illumination source, if applicable, may comprise any suitable components, and may utilize aspects of the cameras and vision systems described in U.S. Pat. Nos. 8,694,224; 5,760,962; 5,877,897; 5,796,094; 6,302,545; 6,523,964; 6,611,202; 6,201,642; 6,757,109; 6,802,617; 6,806,452; 6,822,563; 6,891,563; 6,946,978; 7,859,565; 6,636,258; 7,145,519; 7,161,616; 7,230,640; 7,248,283; 7,295,229; 7,301,466; 7,592,928; 7,881,496; 7,720,580; 6,882,287; 5,929,786; 5,786,772; 5,550,677; 6,498,620; 5,670,935; 6,396,397; 6,806,452; 6,690,268; 7,005,974; 7,937,667; 7,123,168; 7,004,606; 6,946, 978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication Nos. US-2010-0020170 and/or US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,590,719; 6,201,642; 6,498,620; 5,796,094; 6,559,435; 6,806,452; 6,396,397; 6,822,563; 6,946,978; 7,038,577; 7,720,580 and/or 7,965,336, and/or International Publication Nos. WO/2009/036176 and/or WO/2009/046268, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the display systems described in U.S. Pat. Nos. 7,855,755; 7,370,983; 7,329,013; 7,308,341; 7,289,037; 7,249,860; 7,004,593; 6,690,268; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication No. US-2006-0061008 and/or US-2012-0162427, and/or International Publication No. WO 2012/051500, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

a plurality of cameras configured to be disposed at a vehicle so as to have respective fields of view exterior of the vehicle;

wherein said plurality of cameras, when disposed at the vehicle, comprises a driver-side wide angle camera disposed at a driver-side location and having a wide angle field of view at the driver side of the vehicle and wherein the wide angle field of view of said driver-side wide angle camera encompasses at least a ground region forward of the vehicle, a ground region sideward of the vehicle and a ground region rearward of the vehicle;

wherein said plurality of cameras, when disposed at the vehicle, comprises a driver-side rearward viewing camera disposed at or near the driver-side location and having a field of view along the driver side of the vehicle rearward of the vehicle;

wherein said plurality of cameras, when disposed at the vehicle, comprises a passenger-side wide angle camera disposed at a passenger-side location and having a wide angle field of view at the passenger side of the vehicle and wherein the wide angle field of view of said passenger-side wide angle camera encompasses at least a ground region forward of the vehicle, a ground region sideward of the vehicle and a ground region rearward of the vehicle;

wherein said plurality of cameras, when disposed at the vehicle, comprises a passenger-side rearward viewing camera disposed at or near a passenger-side location and having a field of view along the passenger side of the vehicle and rearward of the vehicle;

wherein said plurality of cameras, when disposed at the vehicle, comprises a rearward camera disposed at a rear portion of the vehicle and having a wide angle field of view that encompasses a ground region rearward of the vehicle;

wherein the rearward field of view of said driver-side rearward viewing camera encompasses a region at least 20 meters rearward of the vehicle and wherein the rearward field of view of said passenger-side rearward viewing camera encompasses a region at least 20 meters rearward of the vehicle;

wherein the rearward field of view of said driver-side rearward viewing camera overlaps the rearward field of view of said passenger-side rearward viewing camera rearward of the vehicle;

an image processor operable to process image data captured by said cameras;

a display operable to display images derived from image data captured by at least some of said cameras;

wherein said display is operable to display images derived from image data captured by all of said plurality of cameras;

wherein, when providing a surround view display function, said display displays images derived from image data captured by all of said plurality of cameras, with (i) the images derived from image data captured by said driver-side wide-angle camera stitched with the images derived from image data captured by said driver-side rearward viewing camera, (ii) the images derived from image data captured by said passenger-side wide-angle camera stitched with the images derived from image data captured by said passenger-side rearward viewing camera, (iii) the images derived from image data captured by said driver-side rearward viewing camera stitched with the images derived from image data captured by said rearward camera, and (iv) the images derived from image data captured by said passenger-side rearward viewing camera stitched with the images derived from image data captured by said rearward camera;

wherein, when providing a panoramic view display function, said display displays rearward panorama images derived from image data captured by said rearward camera, said driver-side rearward viewing camera, and said passenger-side rearward viewing camera; and wherein said image processor is operable to process image data captured by at least some of said cameras to detect objects in the field of view of the at least some of said cameras.

2. The vision system of claim 1, wherein the driver-side location where said driver-side rearward viewing camera is configured to be disposed is at a driver-side exterior rearview mirror of the vehicle and the passenger-side location where said passenger-side rearward viewing camera is configured to be disposed is at a passenger-side exterior rearview mirror of the vehicle.

3. The vision system of claim 2, wherein the driver-side location is at an outboard region of the driver-side exterior rearview mirror of the vehicle and wherein the passenger-side location is at an outboard region of the passenger-side exterior rearview mirror of the vehicle.

4. The vision system of claim 2, wherein said driver-side wide angle camera is disposed in the driver-side exterior rearview mirror and wherein said passenger-side wide angle camera is disposed in the passenger-side exterior rearview mirror.

5. The vision system of claim 1, wherein, when said driver-side wide angle camera is disposed at the vehicle, the wide angle field of view of said driver-side wide angle camera has its principal axis directed at least partially downwardly and away from the driver side of the vehicle, and wherein, when said passenger-side wide angle camera is disposed at the vehicle, the wide angle field of view of said passenger-side wide angle camera has its principal axis directed at least partially downwardly and away from the passenger side of the vehicle.

6. The vision system of claim 1, wherein said plurality of cameras, when disposed at the vehicle, comprises a forward facing camera disposed at a front portion of the vehicle and having a wide angle generally downward field of view forward of the vehicle.

7. The vision system of claim 6, wherein, when providing a surround view display function, said display displays surround view images with (i) the images derived from image data captured by said driver-side wide-angle camera stitched with the images derived from image data captured by said forward facing camera, and (ii) the images derived from image data captured by said passenger-side wide-angle camera stitched with the images derived from image data captured by said forward facing camera.

8. The vision system of claim 1, wherein the field of view said driver-side rearward viewing camera encompasses a blind spot region at the driver side of the vehicle and the field of view said passenger-side rearward viewing camera encompasses a blind spot region at the passenger side of the vehicle.

9. The vision system of claim 1, wherein said plurality of cameras, when disposed at the vehicle, comprises (i) a driver-side blind spot viewing camera disposed at or near the driver-side location of the vehicle and having a field of view that encompasses a blind spot region at the driver side of the vehicle and (ii) a passenger-side blind spot viewing camera disposed at or near the passenger-side location of the vehicle and having a field of view that encompasses a blind spot region at the passenger side of the vehicle.

10. The vision system of claim 9, wherein the field of view of said driver-side rearward viewing camera is rearward of the field of view of said driver-side blind spot viewing camera and the field of view of said passenger-side rearward viewing camera is rearward of the field of view of said passenger-side blind spot viewing camera.

11. The vision system of claim 9, wherein the field of said driver-side blind spot viewing camera is laterally outboard of the field of view of said driver-side rearward viewing camera and the field of view of said passenger-side blind spot viewing camera is laterally outboard of the field of view of said passenger-side rearward viewing camera.

12. The vision system of claim 11, wherein said driver-side rearward viewing camera, said driver-side wide angle camera and said driver-side blind spot viewing camera are disposed in a driver-side exterior rearview mirror assembly of the vehicle, and wherein said passenger-side rearward viewing camera, said passenger-side wide angle camera and said passenger-side blind spot viewing camera are disposed in a passenger-side exterior rearview mirror assembly of the vehicle.

13. The vision system of claim 1, wherein said image processor processes image data of the overlapping portions of the rearward field of view of said driver-side rearward viewing camera and the rearward field of view of said passenger-side rearward viewing camera as stereo vision.

14. The vision system of claim 1, wherein said plurality of cameras, when disposed at the vehicle, comprises a second rearward camera disposed at a rear portion of the vehicle and having a narrower field of view than the wide angle field of view of said rearward camera, and wherein said second rearward camera views substantially rearward of the vehicle.

15. The vision system of claim 1, wherein said vision system comprises a driver side forward viewing camera having a field of view along the driver side of the vehicle forward of the vehicle and a passenger side forward viewing camera having a field of view along the driver side of the vehicle forward of the vehicle, and wherein the field of view of said driver side forward viewing camera overlaps the field of view of said passenger side forward viewing camera at a distance forward of the vehicle.

16. A vision system for a vehicle, said vision system comprising:
  a plurality of cameras configured to be disposed at a vehicle so as to have respective fields of view exterior of the vehicle;
  wherein said plurality of cameras, when disposed at the vehicle, comprises a driver-side wide angle camera disposed at a driver-side location and having a wide angle field of view at the driver side of the vehicle and wherein the wide angle field of view of said driver-side wide angle camera encompasses at least a ground region forward of the vehicle, a ground region sideward of the vehicle and a ground region rearward of the vehicle;
  wherein said plurality of cameras, when disposed at the vehicle, comprises a driver-side rearward viewing camera disposed at or near the driver-side location and having a field of view along the driver side of the vehicle rearward of the vehicle;
  wherein said plurality of cameras, when disposed at the vehicle, comprises a passenger-side wide angle camera disposed at a passenger-side location and having a wide angle field of view at the passenger side of the vehicle and wherein the wide angle field of view of said passenger-side wide angle camera encompasses at least a ground region forward of the vehicle, a ground region sideward of the vehicle and a ground region rearward of the vehicle;
  wherein said plurality of cameras, when disposed at the vehicle, comprises a passenger-side rearward viewing camera disposed at or near a passenger-side location and having a field of view along the passenger side of the vehicle and rearward of the vehicle;
  wherein said plurality of cameras, when disposed at the vehicle, comprises a rearward camera disposed at a rear portion of the vehicle and having a wide angle field of view that encompasses a ground region rearward of the vehicle;
  wherein said plurality of cameras, when disposed at the vehicle, comprises a forward camera disposed at a front portion of the vehicle and having a wide angle field of view forward of the vehicle and wherein the wide angle field of view of said forward camera encompasses at least a ground region forward of the vehicle;
  wherein the rearward field of view of said driver-side rearward viewing camera encompasses a region at least 20 meters rearward of the vehicle and wherein the rearward field of view of said passenger-side rearward viewing camera encompasses a region at least 20 meters rearward of the vehicle;
  wherein the rearward field of view of said driver-side rearward viewing camera overlaps the rearward field of view of said passenger-side rearward viewing camera rearward of the vehicle;
  an image processor operable to process image data captured by said cameras;
  a display operable to display images derived from image data captured by at least some of said cameras;
  wherein said display is operable to display images derived from image data captured by selected ones of said plurality of cameras;
  wherein said image processor is operable to process image data captured by at least some of said cameras to detect objects in the field of view of the at least some of said cameras;
  wherein, when providing a panorama display function, said display displays rearward panorama images derived from image data captured by said rearward camera, said driver-side rearward viewing camera, and said passenger-side rearward viewing camera; and
  wherein, when providing a surround view display function, said display displays surround view images derived from image data captured by all of said plurality of cameras, and wherein the displayed surround view images have a substantially larger extent rearward of the vehicle as compared to sideward of the vehicle and forward of the vehicle.

17. The vision system of claim 16, wherein the driver-side location where said driver-side rearward viewing camera is configured to be disposed is at a driver-side exterior rearview mirror of the vehicle and the passenger-side location where said passenger-side rearward viewing camera is configured to be disposed is at a passenger-side exterior rearview mirror of the vehicle, and wherein the driver-side location is at an outboard region of the driver-side exterior rearview mirror of the vehicle and wherein the passenger-side location is at an outboard region of the passenger-side exterior rearview mirror of the vehicle, and wherein said driver-side wide angle camera is disposed in the driver-side exterior rearview mirror and wherein said passenger-side wide angle camera is disposed in the passenger-side exterior rearview mirror.

18. The vision system of claim 16, wherein said image processor processes image data of the overlapping portions of the rearward field of view of said driver-side rearward viewing camera and the rearward field of view of said passenger-side rearward viewing camera as stereo vision.

19. A vision system for a vehicle, said vision system comprising:
  a plurality of cameras configured to be disposed at a vehicle so as to have respective fields of view exterior of the vehicle;
  wherein said plurality of cameras, when disposed at the vehicle, comprises a driver-side wide angle camera disposed at a driver-side location and having a wide angle field of view at the driver side of the vehicle and wherein the wide angle field of view of said driver-side wide angle camera encompasses at least a ground region forward of the vehicle, a ground region sideward of the vehicle and a ground region rearward of the vehicle;
  wherein said plurality of cameras, when disposed at the vehicle, comprises a driver-side rearward viewing camera disposed at or near the driver-side location and having a field of view along the driver side of the vehicle rearward of the vehicle;
  wherein said plurality of cameras, when disposed at the vehicle, comprises a passenger-side wide angle camera disposed at a passenger-side location and having a wide angle field of view at the passenger side of the vehicle and wherein the wide angle field of view of said passenger-side wide angle camera encompasses at least a ground region forward of the vehicle, a ground region sideward of the vehicle and a ground region rearward of the vehicle;
  wherein said plurality of cameras, when disposed at the vehicle, comprises a passenger-side rearward viewing camera disposed at or near a passenger-side location and having a field of view along the passenger side of the vehicle and rearward of the vehicle;

wherein said plurality of cameras, when disposed at the vehicle, comprises a rearward wide angle camera disposed at a rear portion of the vehicle and having a wide angle field of view that encompasses a ground region rearward of the vehicle;

wherein said plurality of cameras, when disposed at the vehicle, comprises a rearward narrow angle camera disposed at a rear portion of the vehicle and having a narrower field of view than the wide angle field of view of said rearward wide angle camera, and wherein said second rearward camera views substantially rearward of the vehicle beyond the ground region encompassed by the wide angle field of view of said rearward wide angle camera;

wherein said plurality of cameras, when disposed at the vehicle, comprises a forward camera disposed at a front portion of the vehicle and having a wide angle field of view forward of the vehicle and wherein the wide angle field of view of said forward camera encompasses at least a ground region forward of the vehicle;

wherein the rearward field of view of said driver-side rearward viewing camera encompasses a region at least 20 meters rearward of the vehicle and wherein the rearward field of view of said passenger-side rearward viewing camera encompasses a region at least 20 meters rearward of the vehicle;

wherein the rearward field of view of said driver-side rearward viewing camera overlaps the rearward field of view of said passenger-side rearward viewing camera rearward of the vehicle;

an image processor operable to process image data captured by said cameras;

a display operable to display images derived from image data captured by at least some of said cameras;

wherein said display is operable to display images derived from image data captured by all of said plurality of cameras;

wherein said image processor is operable to process image data captured by at least some of said cameras to detect objects in the field of view of the at least some of said cameras;

wherein, when providing a panorama display function, said display displays rearward panorama images derived from image data captured by said rearward camera, said driver-side rearward viewing camera, and said passenger-side rearward viewing camera; and wherein, when providing a surround view function, said display displays surround view images derived from image data captured by all of said plurality of cameras, and wherein the displayed surround view images have a substantially larger extent rearward of the vehicle as compared to sideward of the vehicle and forward of the vehicle.

20. The vision system of claim 19, wherein said image processor processes, as a panoptic light field, image data captured by said rearward narrow angle camera, said driver-side rearward viewing camera, said passenger side rearward viewing camera, and wherein said processor feeds the processed panoptic light field into one of (i) a 3D display and (ii) a machine vision driver assistance system of the vehicle.

* * * * *

UNITED STATES PATENT AND TRADEMARK OFFICE
CERTIFICATE OF CORRECTION

PATENT NO. : 10,127,463 B2
APPLICATION NO. : 14/946853
DATED : November 13, 2018
INVENTOR(S) : Manfred Fürsich Page 1 of 1

It is certified that error appears in the above-identified patent and that said Letters Patent is hereby corrected as shown below:

In the Specification

Column 9
Line 17, "an a rear" should be --an area--

Signed and Sealed this
First Day of January, 2019

Andrei Iancu
*Director of the United States Patent and Trademark Office*